US011879435B1

(12) United States Patent
Westergaard

(10) Patent No.: US 11,879,435 B1
(45) Date of Patent: Jan. 23, 2024

(54) SYSTEMS AND METHODS FOR COLD-CLIMATE OPERATION OF A FLUID-FLOW BASED ENERGY GENERATION SYSTEM

(71) Applicant: AEROMINE TECHNOLOGIES, INC., Houston, TX (US)

(72) Inventor: Carsten Hein Westergaard, Houston, TX (US)

(73) Assignee: AEROMINE TECHNOLOGIES, INC., Houston, TX (US)

( * ) Notice: Subject to any disclaimer, the term of this patent is extended or adjusted under 35 U.S.C. 154(b) by 0 days.

(21) Appl. No.: 18/212,318

(22) Filed: Jun. 21, 2023

(51) Int. Cl.
  F03D 7/06 (2006.01)
  F03D 9/25 (2016.01)
  H02P 9/00 (2006.01)
  H02P 101/15 (2016.01)

(52) U.S. Cl.
  CPC ............ F03D 7/065 (2023.08); F03D 9/255 (2017.02); H02P 9/006 (2013.01); F05B 2270/30 (2013.01); H02P 2101/15 (2015.01)

(58) Field of Classification Search
  CPC .......... F03D 7/065; F03D 9/255; H02P 9/006; H02P 2101/15; F05B 2270/30
  See application file for complete search history.

(56) References Cited

U.S. PATENT DOCUMENTS

| 2,485,543 A | 11/1949 | De |
| 2,488,467 A | 11/1949 | De |
| 2,784,556 A | 3/1957 | Perdue |
| 5,709,419 A | 1/1998 | Roskey |
| 6,437,457 B2 | 8/2002 | Roskey |
| 7,132,758 B2 | 11/2006 | Rochester et al. |
| 7,354,245 B2 | 4/2008 | Baba |
| 8,461,713 B2 | 6/2013 | Sammy |
| 9,000,605 B2 | 4/2015 | Glass |
| 9,194,361 B2 | 11/2015 | Roberts |

(Continued)

FOREIGN PATENT DOCUMENTS

| AT | 512326 B1 | 9/2013 |
| CN | 101605988 B | 11/2012 |

(Continued)

OTHER PUBLICATIONS

Balduzzi et al., " Rooftop siting of a small wind turbine using a hybrid BEM-CFD model," Book chapter: Wind Energy Exploitation in Urban Environment, Springer, 2018, 25 Pages.

(Continued)

*Primary Examiner* — Joseph Ortega
(74) *Attorney, Agent, or Firm* — Sheppard, Mullin, Richter & Hampton LLP

(57) ABSTRACT

A turbine controller system and method for a fluid-driven power generation unit may include an electrical circuit that connects to a power source and a rotor of a generator of the fluid-driven power generation unit. A turbine control circuit, which may include multiple circuits, may receive data from sensors or from external sources and may generate a signal to control the generator based on a determination that at least one weather condition exists. Control may be effectuated by motoring the rotor of the generator to mitigate a potential impact of the determined at least one weather condition on the fluid-driven power generation unit.

21 Claims, 18 Drawing Sheets

(56) References Cited

U.S. PATENT DOCUMENTS

| | | |
|---|---|---|
| 9,249,810 B2 | 2/2016 | Gammack et al. |
| 9,567,856 B2 | 2/2017 | Faller |
| 10,161,382 B2 | 12/2018 | Kogan et al. |
| 10,280,895 B1 | 5/2019 | Keeley |
| 11,035,340 B2 | 6/2021 | Church |
| 11,047,360 B1 | 6/2021 | Houchens et al. |
| 11,118,564 B2 | 9/2021 | Westergaard |
| 11,391,262 B1 | 7/2022 | Westergaard |
| 2008/0181771 A1 | 7/2008 | Papp |
| 2010/0213716 A1 | 8/2010 | Santoro |
| 2010/0215488 A1 | 8/2010 | Santoro |
| 2011/0042959 A1 | 2/2011 | Kelly |
| 2012/0099977 A1 | 4/2012 | Churchill et al. |
| 2013/0099502 A1 | 4/2013 | Roberts |
| 2013/0139454 A1 | 6/2013 | Roudot et al. |
| 2013/0216356 A1 | 8/2013 | Faller |
| 2014/0169937 A1 | 6/2014 | Gysling et al. |
| 2015/0300183 A1 | 10/2015 | Dumlupinar et al. |
| 2017/0175707 A1 | 6/2017 | Beckers et al. |
| 2017/0298900 A1 | 10/2017 | Westergaard |
| 2018/0266390 A1 | 9/2018 | Westergaard et al. |
| 2023/0061818 A1 | 3/2023 | Westergaard |
| 2023/0272774 A1* | 8/2023 | Khokhar .............. F03D 7/043 290/44 |

FOREIGN PATENT DOCUMENTS

| | | |
|---|---|---|
| CN | 206232423 | 6/2017 |
| CN | 206280186 | 6/2017 |
| CN | 108779762 B | 9/2020 |
| DE | 2402647 | 7/1975 |
| DE | 202007004034 U1 | 5/2007 |
| EP | 1586770 | 10/2005 |
| EP | 2344756 B1 | 4/2017 |
| EP | 2425128 B1 | 12/2018 |
| EP | 3207244 B1 | 4/2019 |
| EP | 3597900 A1 | 1/2020 |
| FR | 2962171 B1 | 6/2015 |
| JP | S56167897 | 12/1981 |
| JP | S57206778 A | 12/1982 |
| JP | 2019060237 A | 4/2019 |
| KR | 101663597 B1 | 10/2016 |
| KR | 101696723 B1 | 1/2017 |
| NL | 1013205 C2 | 4/2001 |
| RU | 2638120 C1 | 12/2017 |
| WO | WO 2001/025629 | 4/2001 |
| WO | WO 2003/081030 | 10/2003 |
| WO | WO 2009/030879 | 3/2009 |
| WO | WO 2014/022770 A1 | 2/2014 |
| WO | WO 2015/192102 A1 | 12/2015 |
| WO | WO 2016/054080 | 4/2016 |
| WO | WO 2020/039459 | 2/2020 |

OTHER PUBLICATIONS

Cresswell et al., "The impact of diffuser augmentation on a tidal stream turbine," Ocean Engineering 108 (2015) 155-163.

Delafond, F., "Problems Concerning Automatic Conneciton of an Aerogenerator to a Network—Translation of: "Problemes concernant le couplage automatique d'un aerogenerateur sur un reseau,", United Nations Conference on New Sources of Engergy, 1961, Proceedings. Solar Engery, Wind Power and Geothermal Energy, Rome, Aug. 21-31, 1961; vol. 7, Wind Power, pp. 390-394," NASA Technical Translation, NASA TT FI4,873, Washington, D.C. 20546 Apr. 1973, 15 pages.

Houchens et al., "A novel energy-conversion device for wind and hydrokinetic applications," Proceedings of the ASME-JSME-KSME 2019 Joint Fluids Engineering Conference, Jul. 28-Aug. 1, 2019, San Francisco, CA, USA, 6 pages.

Hutter, Ulrich, "Past Developments of Large Wind Generators in Europe," University of Stuttgart (1968) 4 pages.

Montazeri, et al., "CFD simulation of cross-ventilation in buildings using rooftop wind- catchers: Impact of outlet openings," Journal of Renewable Energy 118 (2018) 502-520.

Oliver et al., "Wind Turbine Blades Equipped with Air-Jet Vortex Generators: Full Scale Verification of Blade Optimised for Increased Performance," European Wind Energy Conference, Oct. 1997, Dublin Castle, Ireland, 5 pages.

Pols et al., "Performance of AeroMINEs for Distributed Wind Engery," AIAA Scitech 2020 Forum, Orlando, Florida, Jan. 6-10, 2020, 8 pages.

Price, Trevor J., "UK Large-Scale Wind Power Programme From 1970 to 1990:The Carmarthen Bay Experiments and the Musgrove Vertical-Axis Turbines," Wind Engineering, vol. 30, No. 3 (2006), 19 pages.

Selig et al., "Summary of Low-Speed Airfoil Data," vol. 1, 1995, 315 pages.

Van Bussel, et al., "The science of making more torque from wind: Diffuser experiments and theory revisited," The Science of Making Torque from Wind, Journal of Physics: Conference Series 75 (2007), doi:10.1088/1742-6596/75/1/012010, 12 pages.

International Search Report and Written Opinion dated Dec. 13, 2022 for International Application No. PCT/US2022/041483, filed Aug. 25, 2022.

* cited by examiner

Fig. 11

SYSTEMS AND METHODS FOR COLD-CLIMATE OPERATION OF A FLUID-FLOW BASED ENERGY GENERATION SYSTEM

TECHNICAL FIELD

The disclosed technology relates generally to renewable energy, and more particularly, some embodiments relate to systems and methods for improving cold weather operability of fluid-flow-based renewable energy generators.

DESCRIPTION OF THE RELATED ART

The demand for and level of interest in renewable energy continues to climb, and the race for new technologies is on. Governments, research institutes, private corporations and startups are developing new and increasingly efficient renewable energy sources for various different applications. Wind and other fluid power has been in use for as long as, if not longer than, any other form of renewable energy. Centuries ago, our ancestors used windmills, for example, to pump water and grind grains. By the late 19th century, wind turbines were in use to produce electricity.

Fast forward to 1953, when De Havilland Propellers Ltd. built a 100 kW wind turbine in St. Albans, Prince (2006), UK based on the Andreau-Enfield wind turbine. Later, in 1957 the Algerian Gas and Electricity Company built a similar turbine at Grand Vent, Delafond (1961). Both turbines had a diameter of 24 meters, driven by the external wind flow. A smaller internal fan is driven by a separate internal flow stream through the hollow wind turbine blade, in which an airflow is allowed to exit the tip of the blade. The flow inside the blade is driven by the centrifugal force, and essentially the whole rotor is operating as a centrifugal pump. The pump draws the air from the base of the tower, where airflow passes an axial fan (or centrifugal or radial fan) which extracts the power. However, the flow path contains a number of rather severe restrictions with associated pressure losses.

Wind turbines have evolved substantially since that time, but there is still room for improvement with the mechanisms used to convert fluid flow into electricity. In conventional wind turbines and diffusor augmented wind turbines (DAWT), there is only a single flow stream. As the rotor thrust increases, flow rates through the rotor decrease. For DAWT turbines, this decreases the flow circulation around the diffusor airfoils and decreases their impact. When placed on a building or other structure with a large wind shear and speed up, it can be difficult to uphold the rotor thrust, adequately.

Diffusor augmented wind turbines (DAWT) or shrouded rotors have been incorrectly touted as exceeding the Betz limit because the rotor diameter has been used as a reference as opposed to the largest diameter of the diffusor. DAWTs with short shrouds act like open rotors with limited or no additional back pressure on the rotor. However, with longer shrouds an additional negative back pressure behind the rotor appears, augmenting both the power coefficient (Cp) and thrust (Ct) of the rotor.

Ordinary wind turbines with a free rotor produce power from the fluid without a pressure differential from the inlet domain far upstream to the outlet domain for downstream, albeit a rotor thrust in the vicinity of the rotor can be interpreted as a pressure differential. In a DAWT system this near rotor pressure differential can be somewhat larger because of the encasing diffusor, but ultimately there is only one flow stream and the same constraints as a free rotor exist. Either is unlike the Andreau-Enfield wind turbine where the fluid power extraction and the pressure generation are almost completely uncoupled into two separate flow streams.

While utility wind has been massively successful over the past two decades, driven by low cost of energy and the increasing demand for renewable energy, small wind has not been able to accelerate its impact. This is due to the high cost/performance and complexity in deployment, in spite of the growing interest in renewables. This is especially true near or on buildings. Built-environment wind turbines (BEWT) do not solve the technical and environmental issues concerning the end-user. This is in contrast to solar photovoltaics (PV) on the other hand, which has exploded in popularity, in part, because it addresses those concerns with a passive installation and minimal intrusion in the local environment.

Brief Summary of Embodiments

Embodiments of the technology disclosed herein are directed toward devices and methods for improving power generation from fluid-flow power generation units in cold weather environments.

In some embodiments, a method for mitigating cold climate impact on a fluid-driven power generation unit may include: a turbine control circuit receiving data indicating weather condition at the fluid-driven power generation unit; the turbine control circuit analyzing received data to determine at least one weather condition; the turbine control circuit assessing a potential impact of the determined at least one weather condition on the fluid-driven power generation unit; the turbine control circuit analyzing performance of the fluid-driven power generation unit; and the turbine control circuit controlling a generator of the fluid-driven power generation unit to motor a rotor of the generator and thereby mitigate the potential impact of the determined at least one weather condition on the fluid-driven power generation unit.

In other embodiments, a turbine controller for a fluid-driven power generation unit that comprises a ducted rotor system, may include: an electrical circuit comprising a power input for connection to a power source and a power output to motor a rotor of a generator of the fluid-driven power generation unit; a plurality of sensors; and a turbine control circuit comprising an input to receive data from the plurality of sensors and an output to send a signal to control the generator of the fluid-driven power generation unit, wherein the turbine control circuit is configured to determine at least one weather condition based on data from one or more of the plurality of sensors and to control the generator to motor the rotor of the generator to mitigate a potential impact of the determined at least one weather condition on the fluid-driven power generation unit.

In yet other embodiments, a fluid-driven power generation unit may include: a power generator comprising a rotor and a stator that converts wind power into electrical energy; an electrical circuit comprising a power input for connection to a power source and a power output to motor the rotor of the generator; a plurality of sensors; and a turbine control circuit comprising an input to receive data from the plurality of sensors and an output to send a signal to control the generator, wherein the turbine control circuit is configured to determine at least one weather condition based on data from one or more of the plurality of sensors and to control the generator to motor the rotor of the generator to mitigate a potential impact of the determined at least one weather condition on the fluid-driven power generation unit.

In various embodiments, the determined at least one weather condition may include a winter precipitation event at the power generation unit and controlling the generator may include motoring the generator to achieve at least minimum rotational speed to avoid precipitation building up in a fluid flow path of the fluid-driven power generation unit.

Embodiments may be implemented to determine a current rotational velocity of a rotor of the generator and motoring the generator to achieve at least minimum rotational velocity may be performed only when the current rotational velocity of the rotor of the generator is below the minimum rotational velocity.

The determined at least one weather condition may include an ambient temperature at the power generation unit and controlling the generator may include motoring the generator to achieve at least minimum rotational velocity to avoid rotor bearing freezeup when the ambient temperature is below a designated temperature.

Embodiments may be configured to switch the generator to a power source to motor the rotor of the generator, wherein the power source may include at least one of a power grid to which the fluid-driven power generation unit is connected, and a battery.

Embodiments may activate an active heat source to further mitigate the potential impact of the determined at least one weather condition.

Motoring a rotor of the generator may include causing the rotor to rotate at a fixed rotational speeds or a selected one of a set of fixed rotational speeds. In other embodiments, motoring a rotor of the generator may include causing the rotor to rotate at a temporally varying rotational speed. Embodiments may further determine a direction to rotate the rotor based on the weather condition.

Other features and aspects of the disclosed technology will become apparent from the following detailed description, taken in conjunction with the accompanying drawings, which illustrate, by way of example, the features in accordance with various embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The technology is applicable in any type of fluid flow, being air, water or other fluids. Often specific fluids use specific jargon, for example in air flow, airfoils are used whereas in water flows, hydrofoils are often used. It is understood that in this text, that when term, such as airfoils are used, the application is not limited to air, the term is only used by example.

Some of the figures included herein illustrate various embodiments of the disclosed technology from different viewing angles. The accompanying text refers to such views as "top," "bottom" or "side" views, and may refer to parts of the structures as "top," "bottom" "end" or "side," and may use terms such as "vertical" and "horizontal" to describe orientations of components. Such references are made to facilitate description of embodiments and are made relative to the orientation of embodiments illustrated in the respective drawings. However, these terms do not imply or require that a power generation unit be implemented or used in a particular spatial orientation. Instead, power generation units may be installed upside-down, on their side or in some other spatial orientation such that a component described as a top component is not on the top of the unit, and so on.

Figure 1:
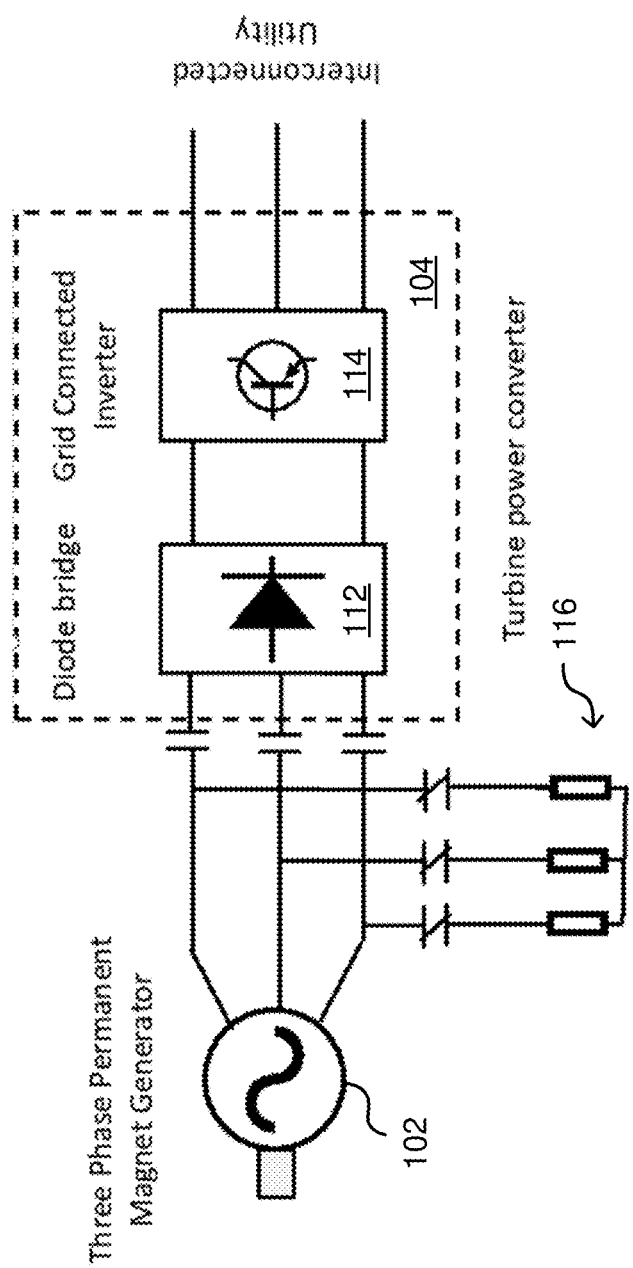

FIG. 1 illustrates an example turbine control module in accordance with various embodiments.

Figure 2:
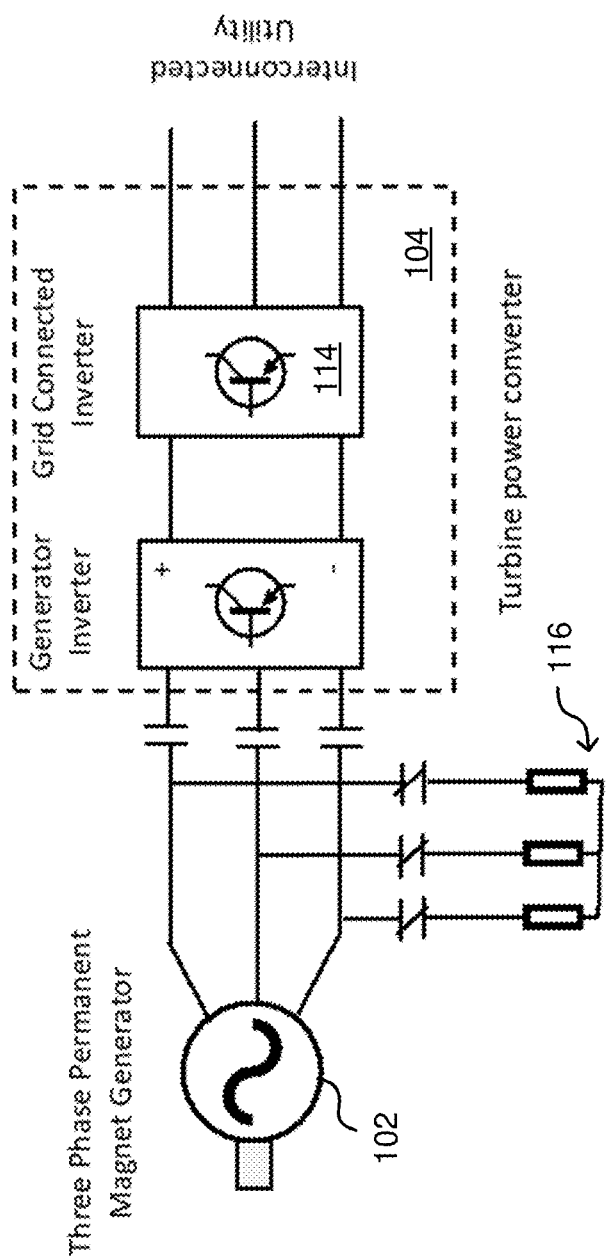

FIG. 2 illustrates an example turbine control module in accordance with various embodiments.

Figure 3:
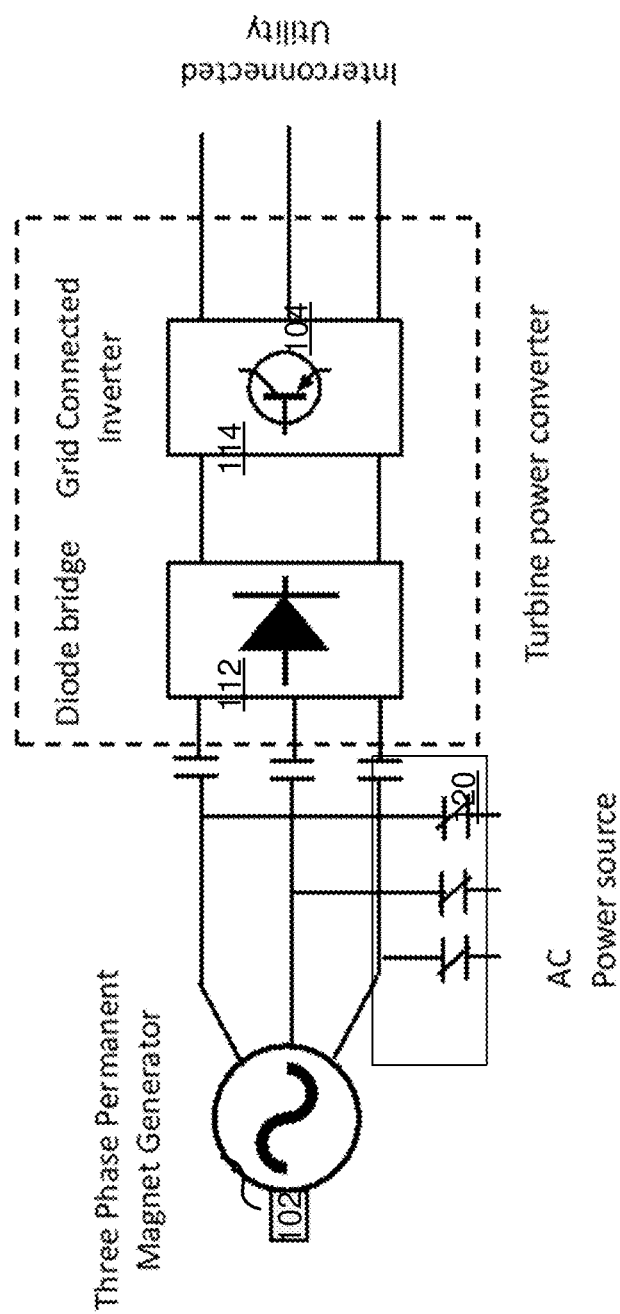

FIG. 3 illustrates an example turbine control module in accordance with various embodiments.

Figure 4:
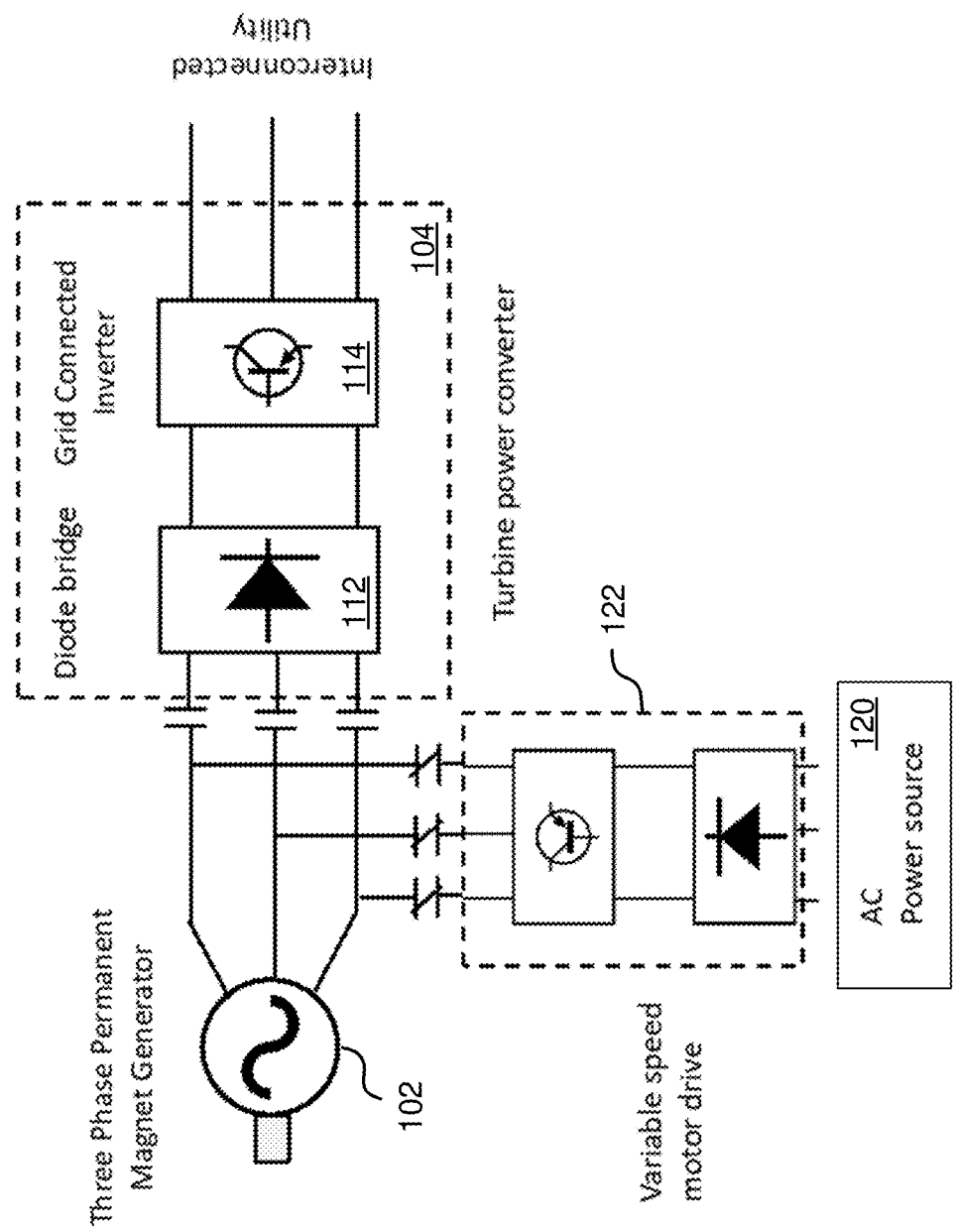

FIG. 4 illustrates an example turbine control module in accordance with various embodiments.

Figure 5:
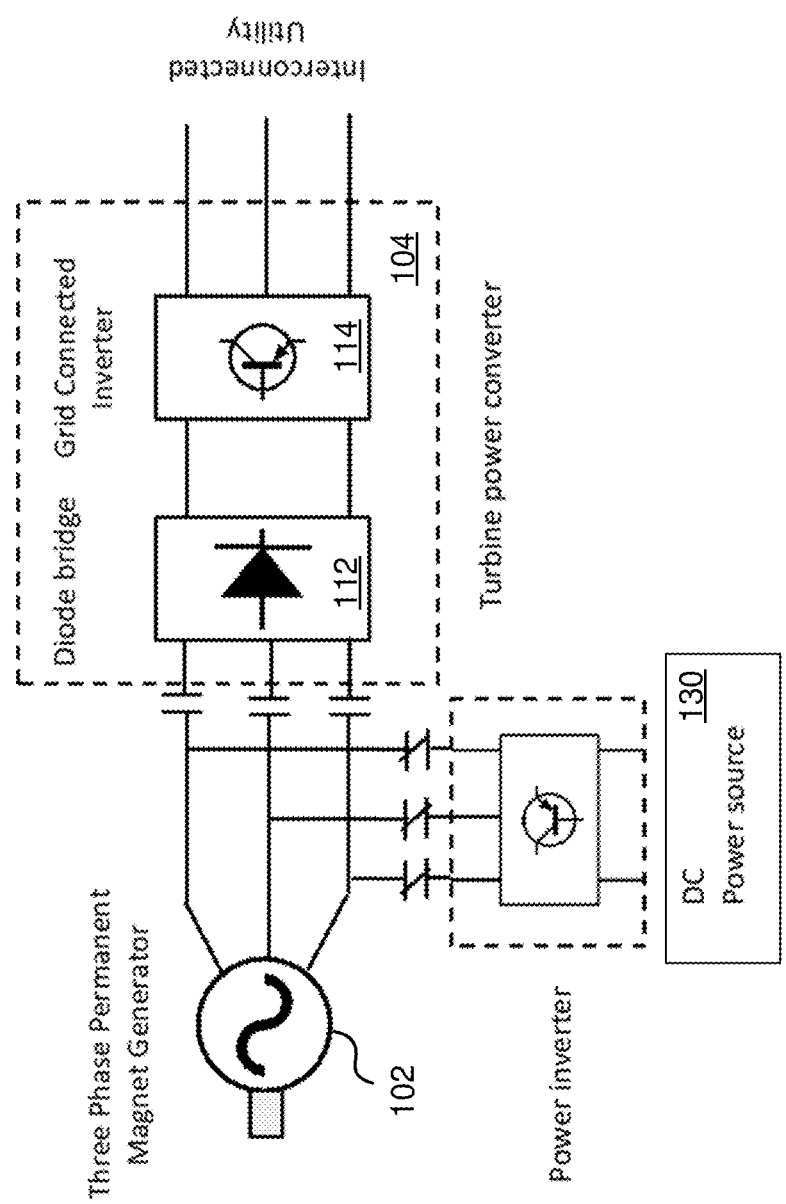

FIG. 5 illustrates an example turbine control module in accordance with various embodiments.

Figure 6:
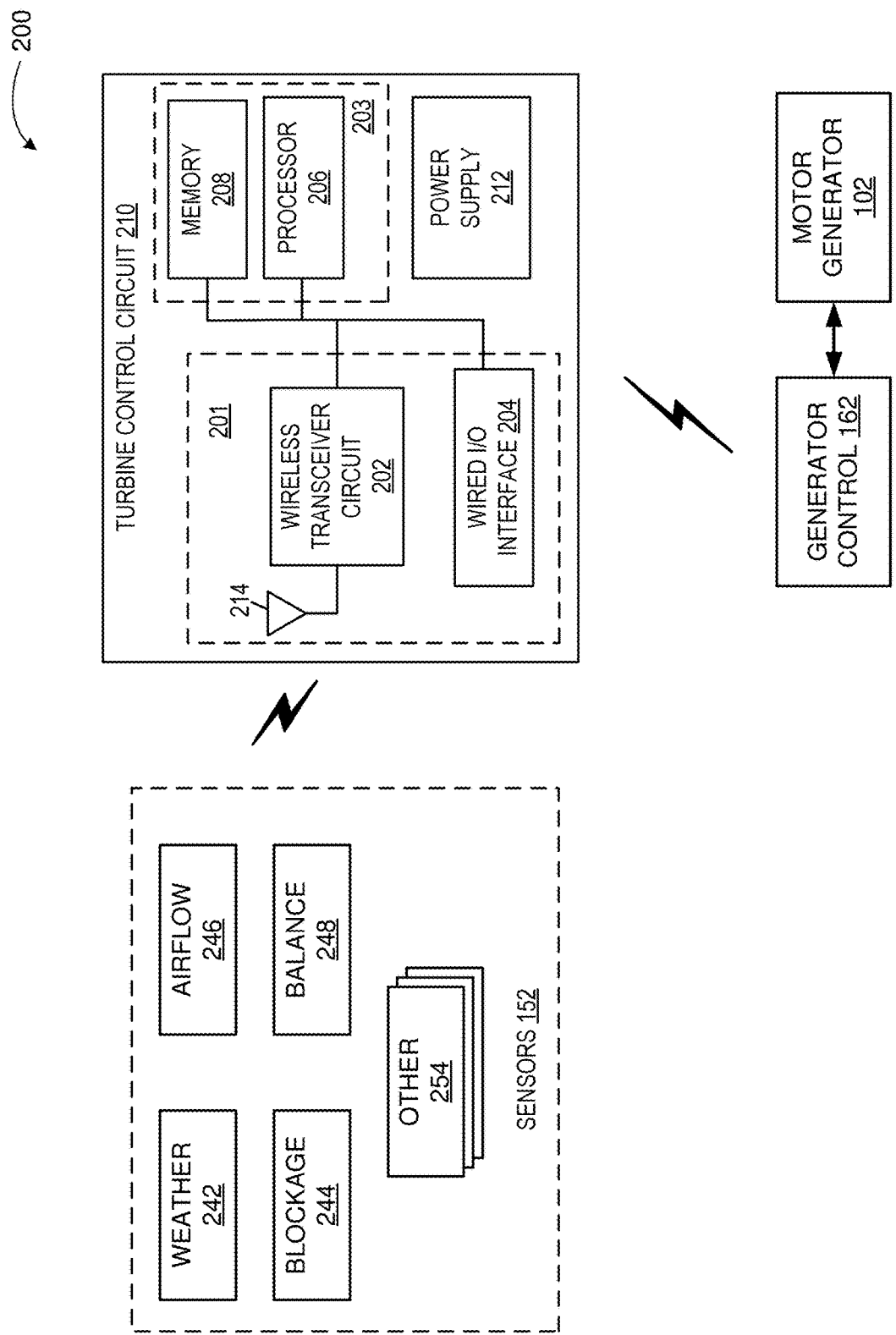

FIG. 6 illustrates an example turbine control unit 200 in accordance with various embodiments.

Figure 7:
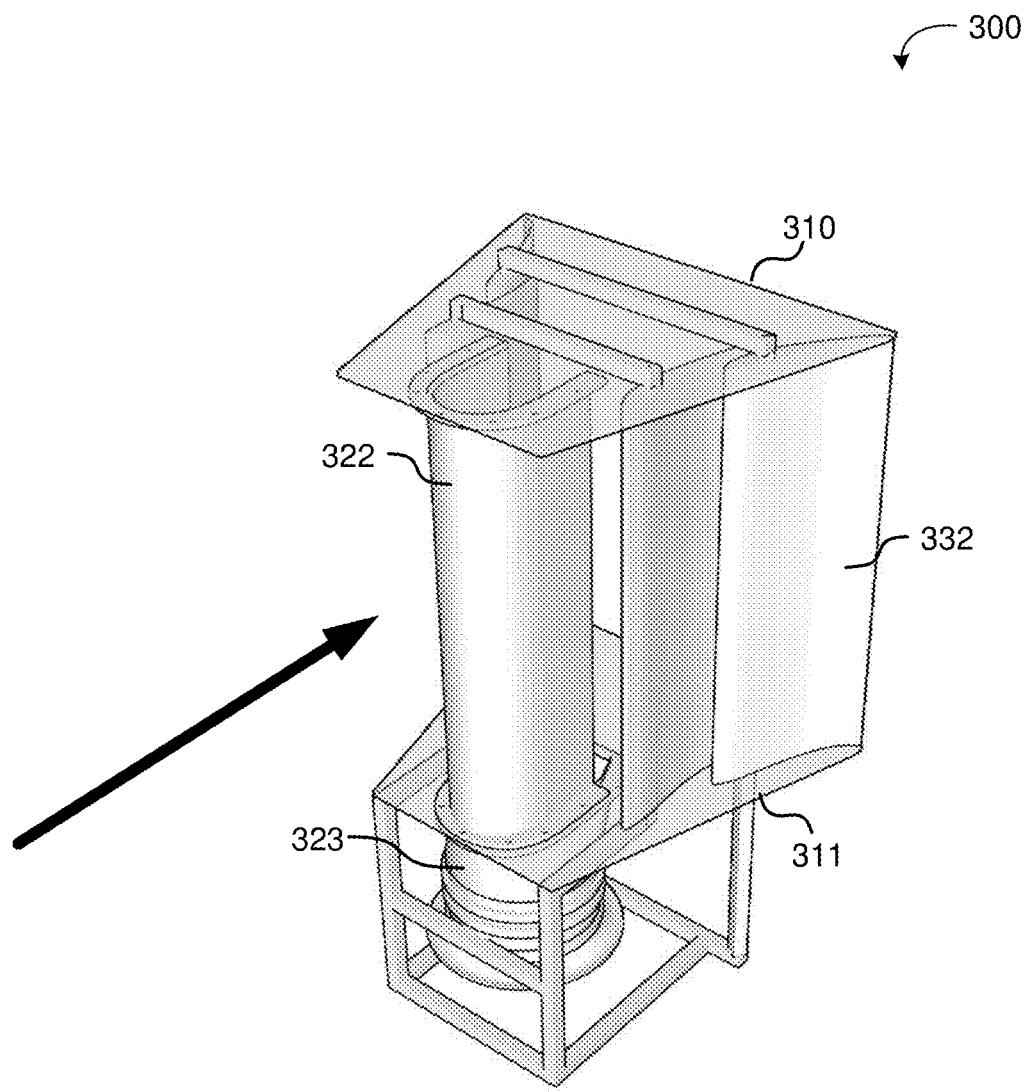

FIG. 7 illustrates an example fluid-driven power generation unit with which embodiments of the systems and methods disclosed herein may be implemented.

Figure 8:
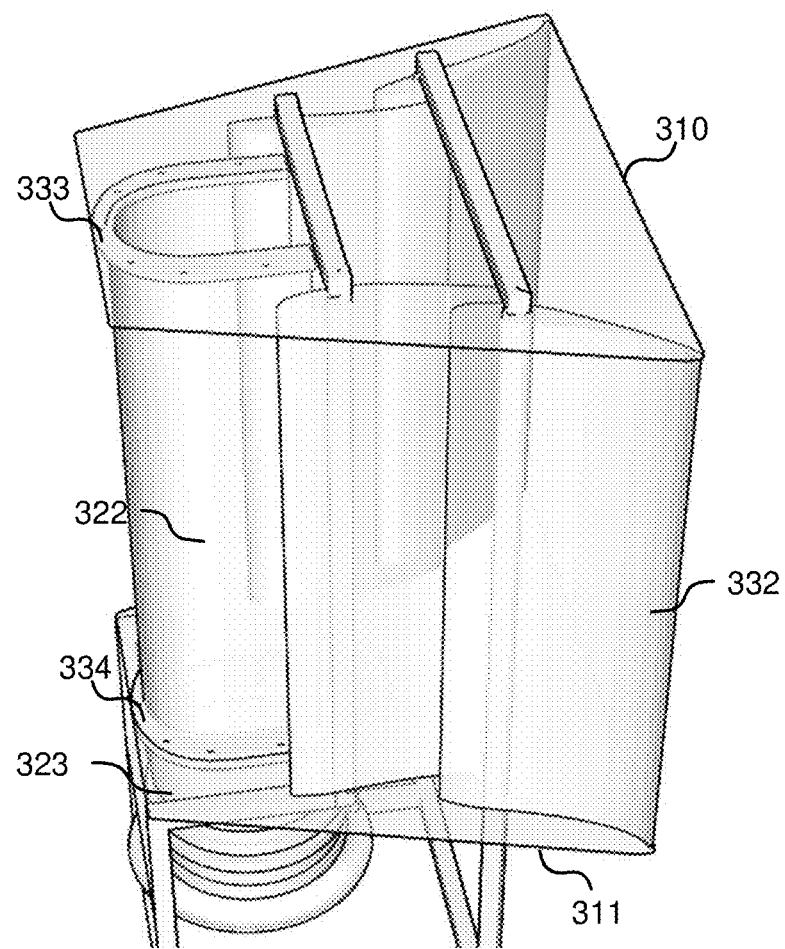

FIG. 8 illustrates another view of the example fluid-driven power generation unit of FIG. 7.

Figure 9:
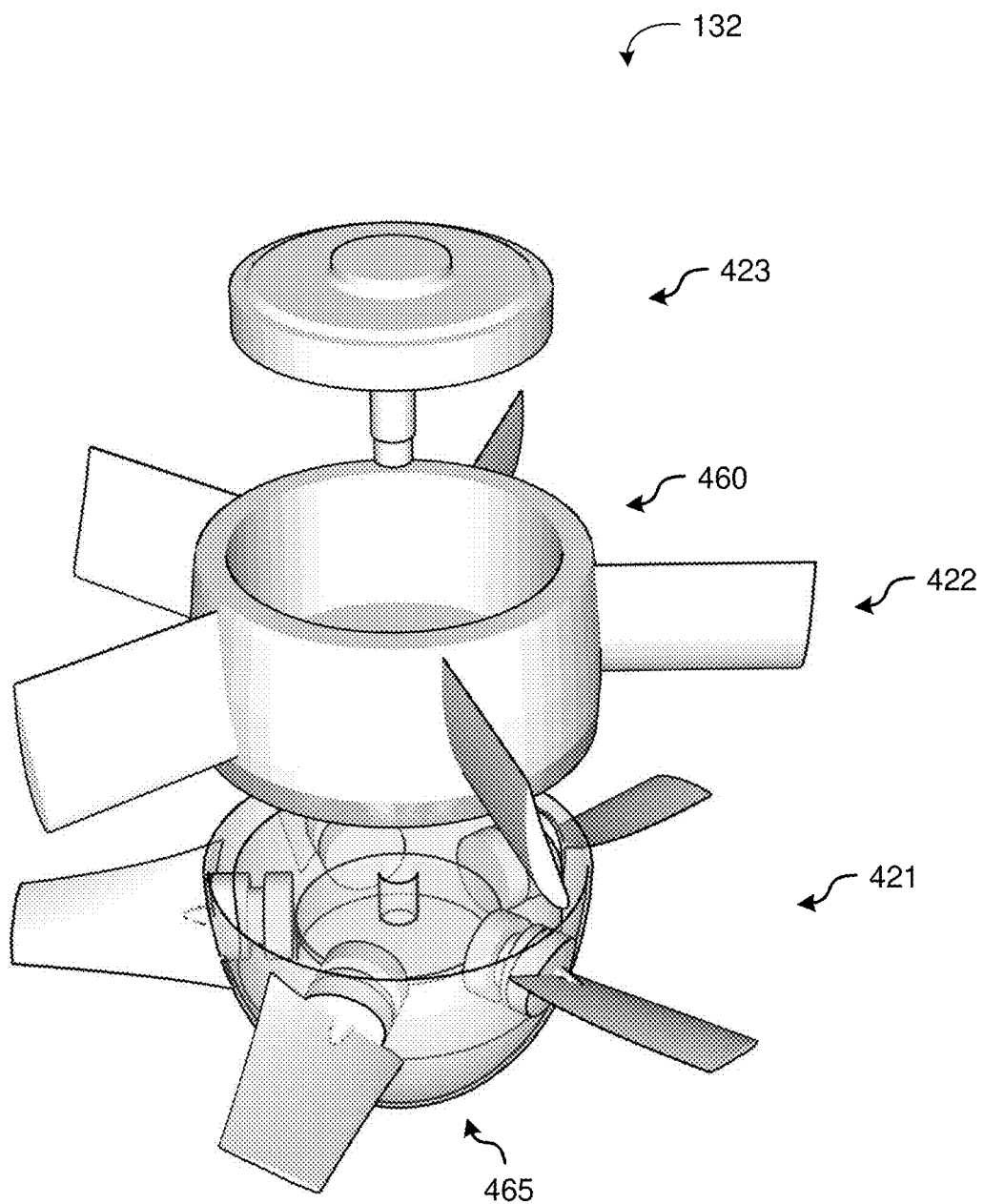

FIG. 9 is a breakaway view illustrating an example generator of an example fluid-driven power generation unit with which embodiments of the systems and methods disclosed herein may be implemented.

Figure 10:
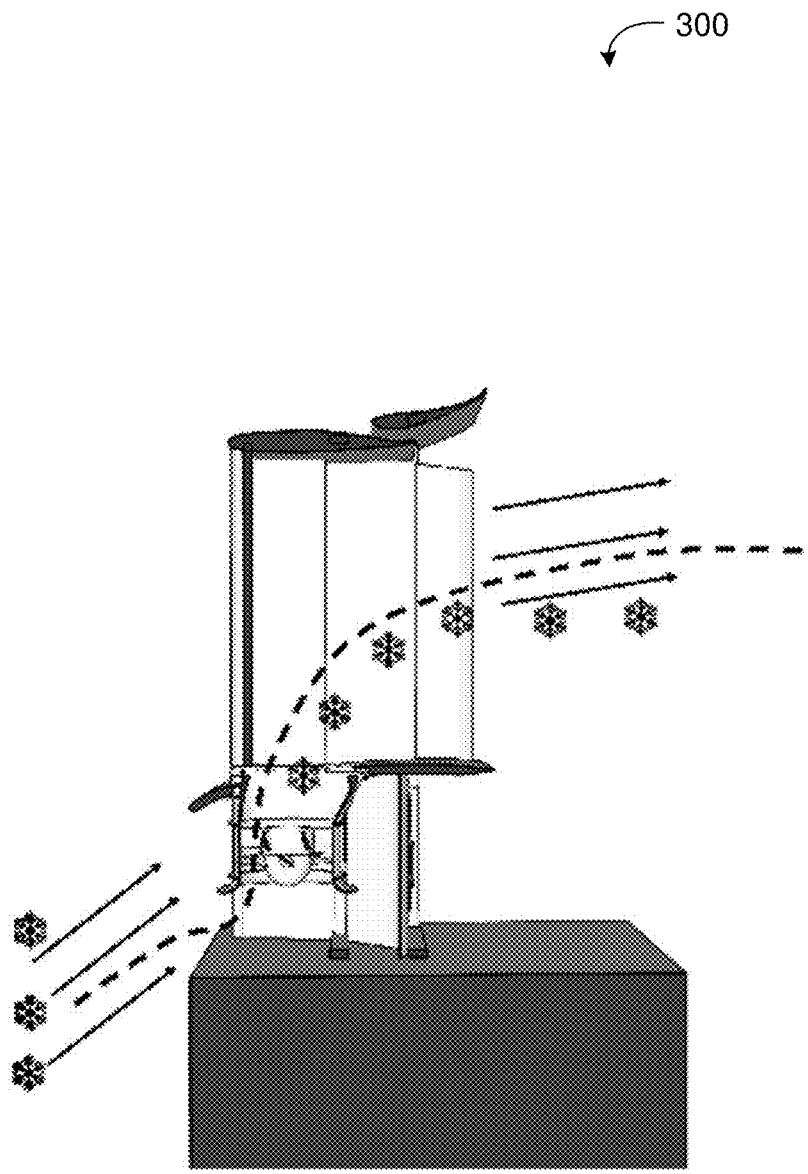

FIG. 10 illustrates an example of precipitation (in this case snow) moving through an example fluid-driven power generation unit (a unit similar to the examples of FIGS. 7 and 8).

Figure 11:
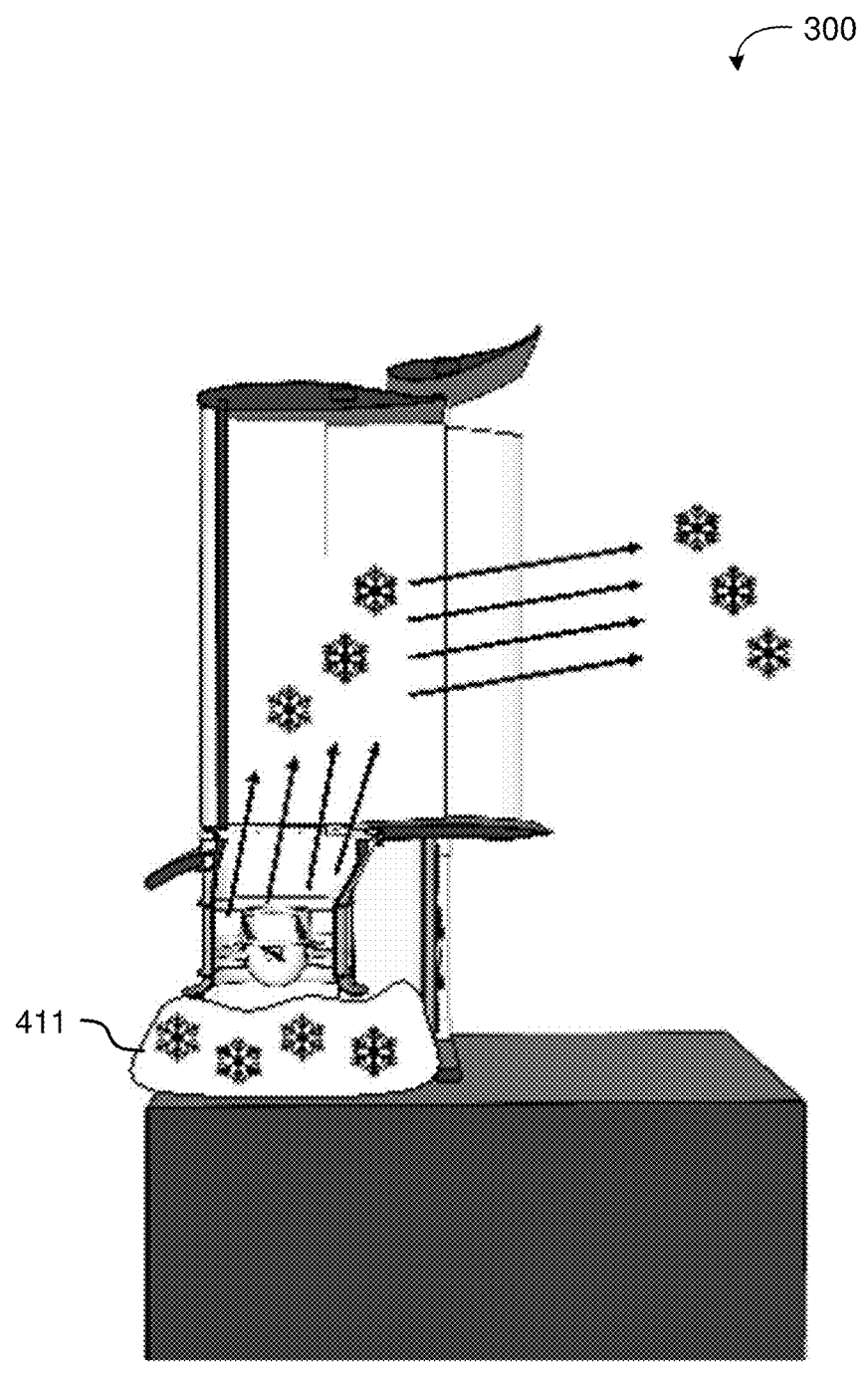

FIG. 11 illustrates an example of precipitation (in this case snow) built up proximate the entry of the fluid-flow path of an example fluid-driven power generation unit (a unit similar to the examples of FIGS. 7 and 8).

Figure 12:
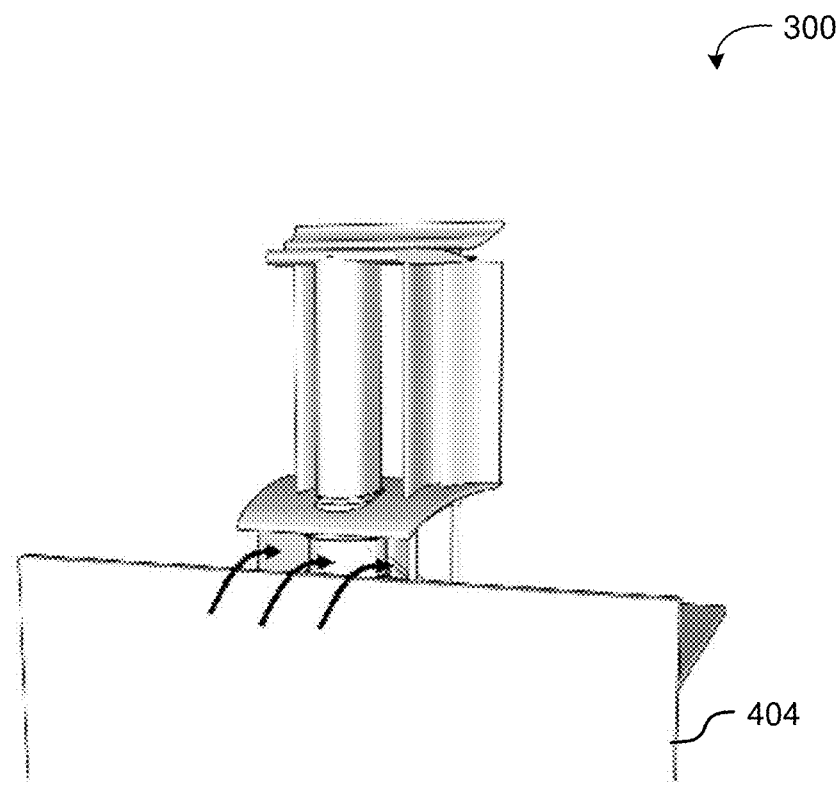

FIG. 12 illustrates an example of a fluid-driven power generation unit (a unit similar to the examples of FIGS. 7 and 8) mounted atop a building at least partially behind a portion of building facade.

Figure 13:
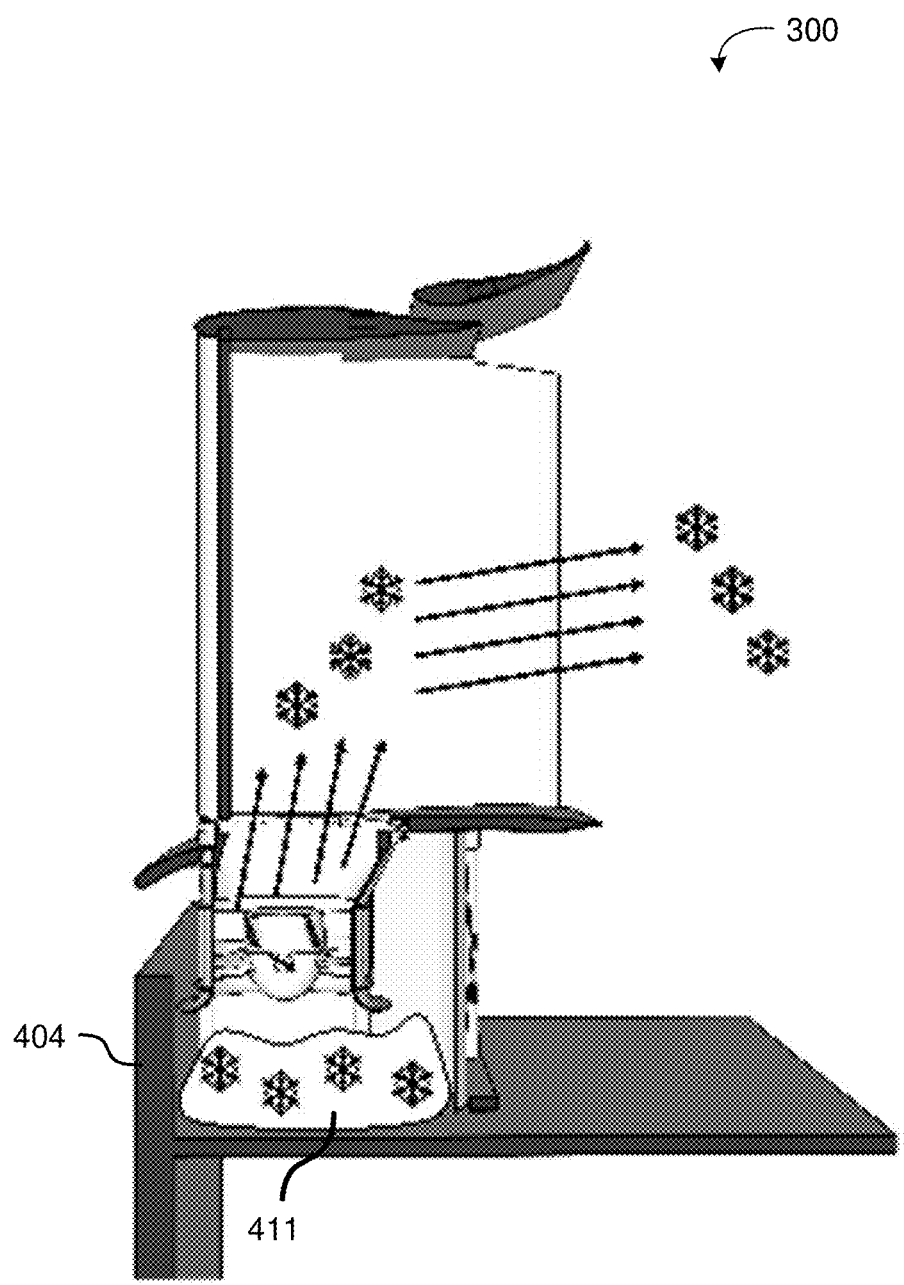

FIG. 13 illustrates an example of precipitation (in this case snow) at least partially blocking the entry of the fluid-flow path of the example fluid-driven power generation unit of FIG. 11.

Figure 14:
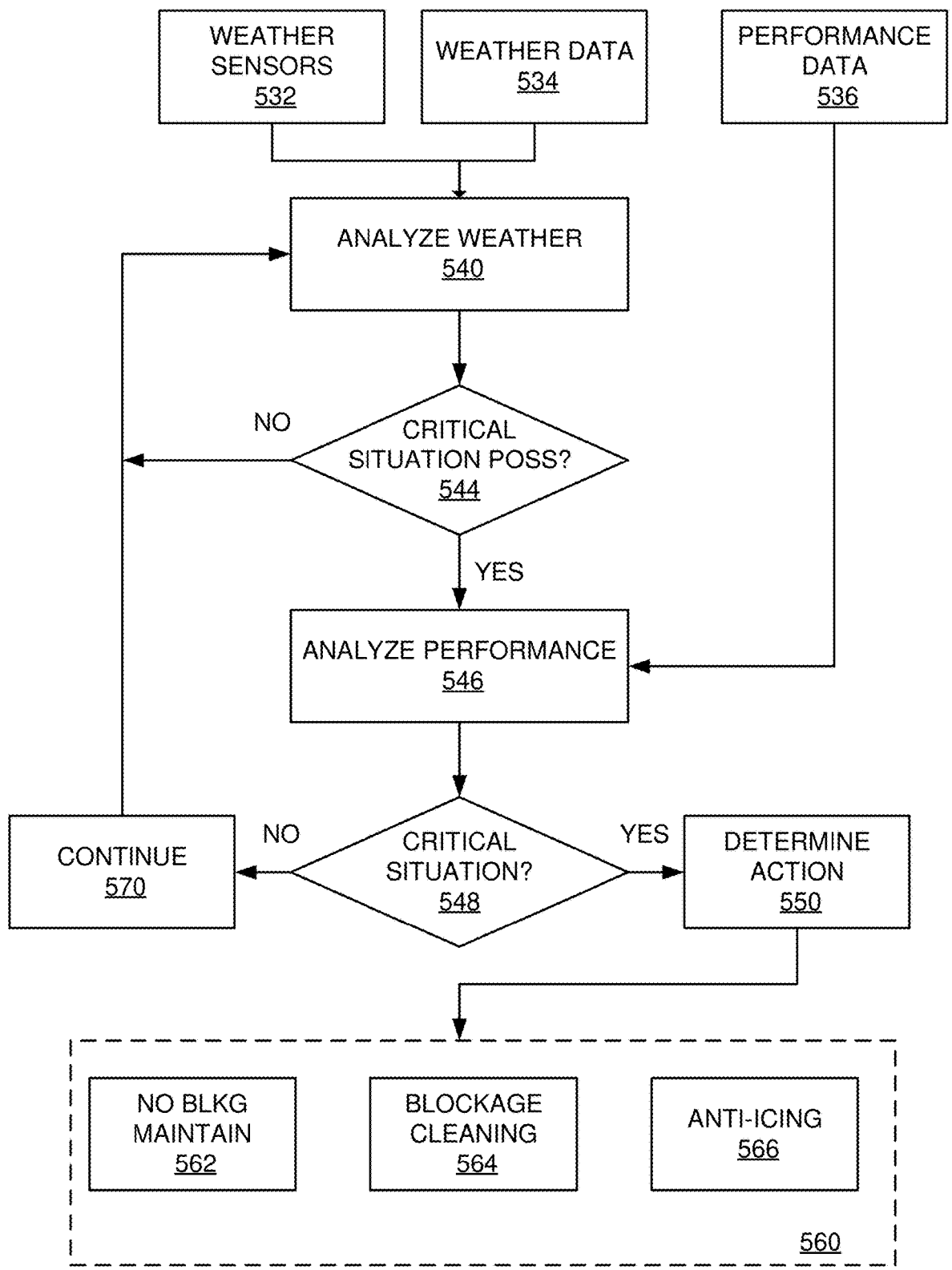

FIG. 14 illustrates an example process flow of the turbine controller in accordance with various embodiments.

Figure 15:
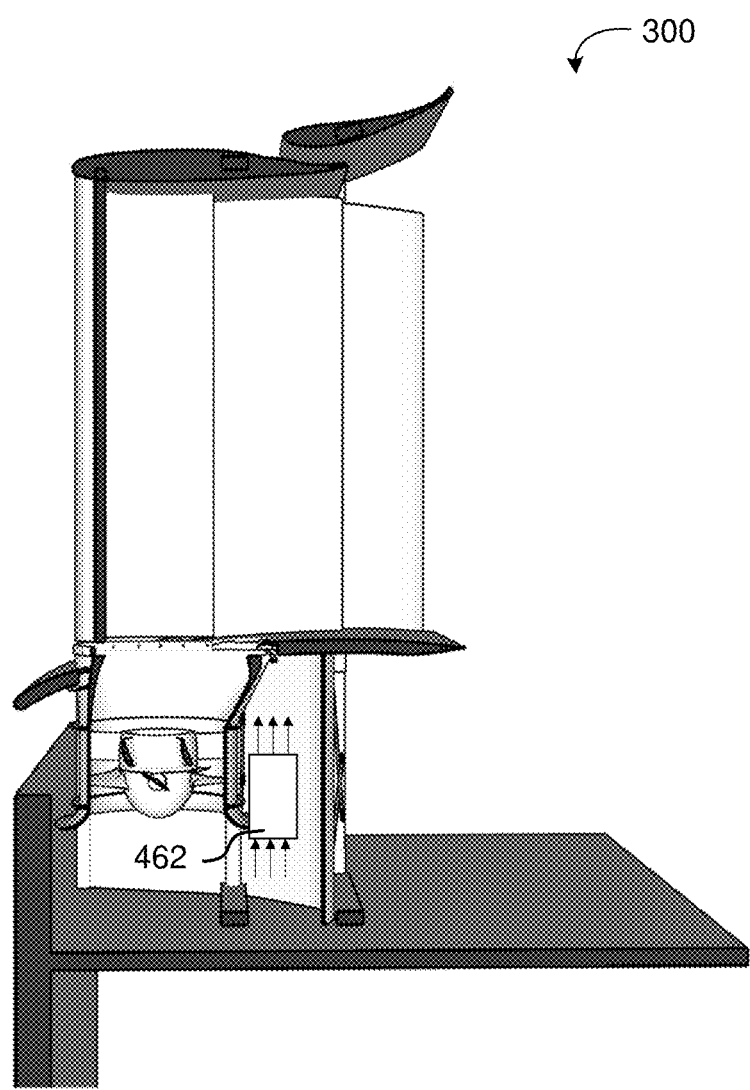

FIG. 15 illustrates an example fluid-driven power generation unit which an active heating component in accordance with various embodiments.

Figure 16:
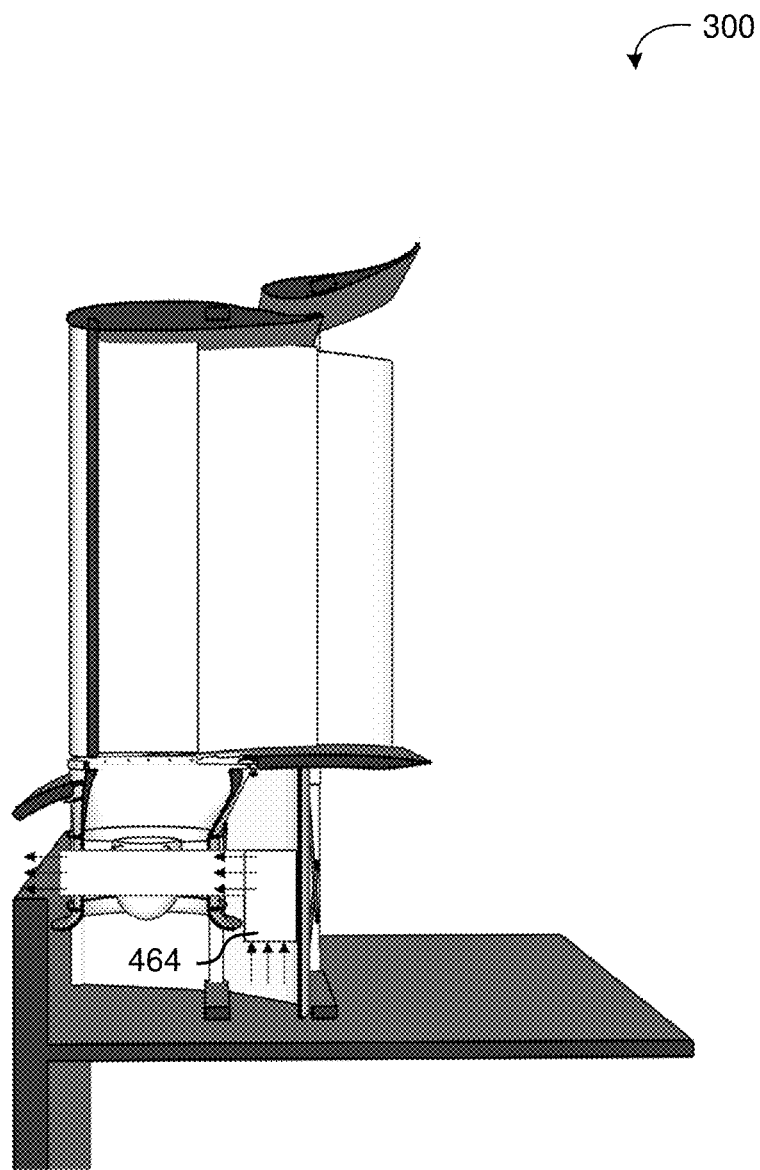

FIG. 16 illustrates another example fluid-driven power generation unit which an active heating component in accordance with various embodiments.

Figure 17:
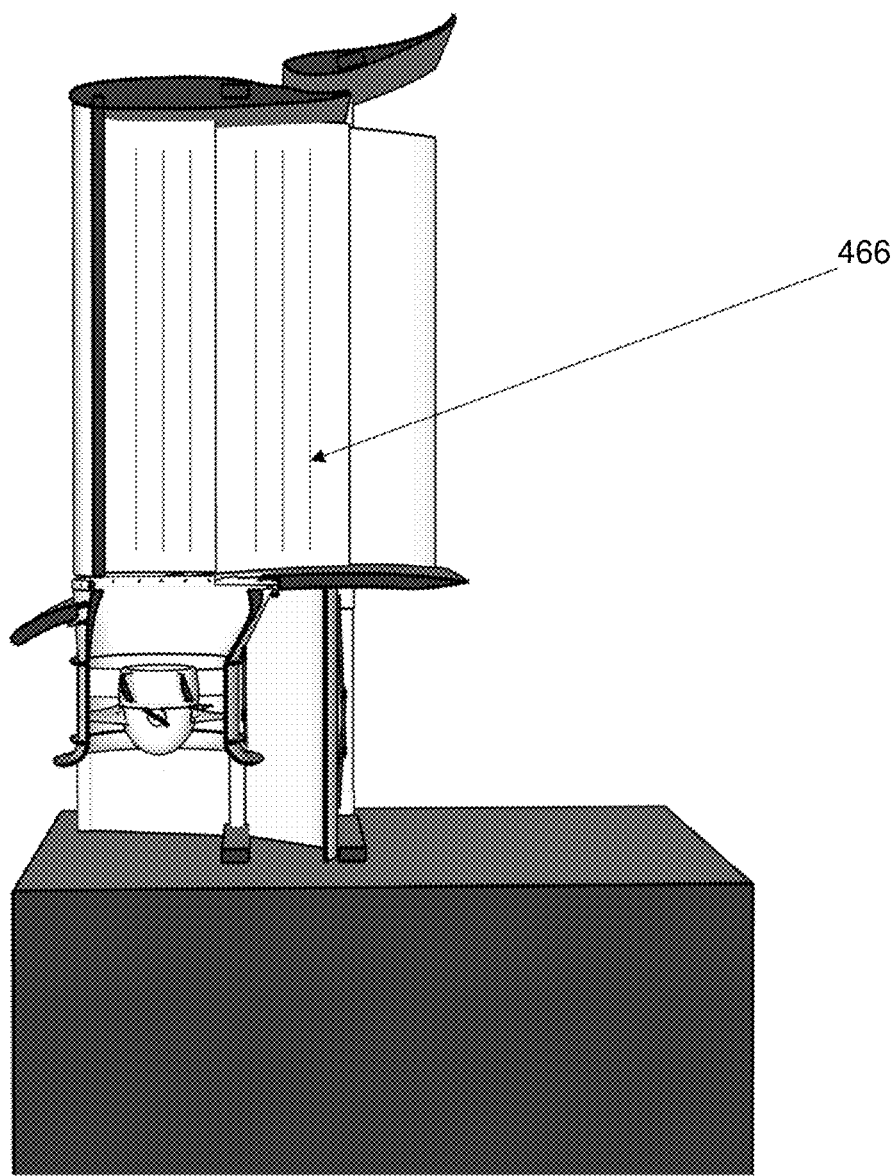

FIG. 17 illustrates yet another example fluid-driven power generation unit which an active heating component in accordance with various embodiments.

Figure 18:
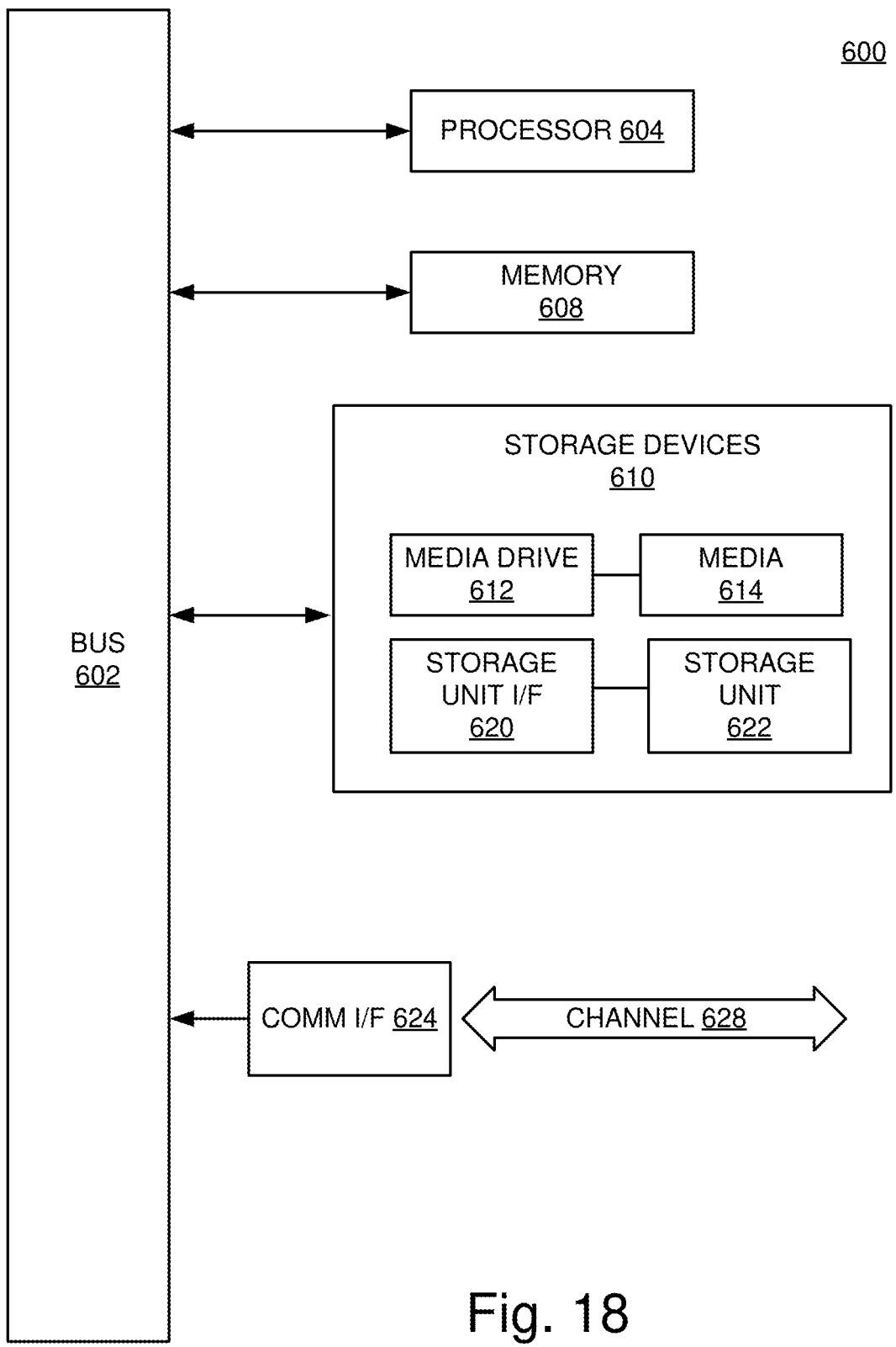

FIG. 18 illustrates an example computing component that may be used to implement various features of embodiments described in the present disclosure.

The figures are not exhaustive and do not limit the disclosure or the disclosed embodiments to the precise form disclosed.

DETAILED DESCRIPTION OF THE EMBODIMENTS

Remote locations, such as Arctic regions, are challenging to operate from an energy perspective. Fuels are expensive to transport to site, solar panels have marginal yearly performance (~8% capacity factor), and wind turbines do not perform well in the extreme climate as they are simply too fragile, unreliable and have low performance. The latter is particularly unfortunate since the Arctic regions are blessed with significant wind resources that could support operations in a much more climate friendly, reliable and financially viable way than fossil fueled generators.

For wind turbines, big or small, installed on or nearby buildings in cold regions, additional risk occurs due the ability to throw ice or densely packed snow from the rotating blades, which could hit people or property, causing impact damage. When the ice or snow accumulation is not released, there is also an associated power performance issue due to the aerodynamic loss induced by the snow and ice, which can be quite severe.

In many cases, ice and snow accumulation on the blades causes an imbalance in the rotor system, which could lead to a shutdown of the system. A similar problem can occur when ventilation cooling fans or their air intakes are covered. In such cases, the ice and snow must be removed, in order to restart the system. Long periods of shutdowns can cause the bearings to freeze, making restart even more difficult, if not impossible.

Other types of wind harvest systems have enclosed rotor systems. One example is found in in U.S. Pat. No. 11,391,262, to Westergaard, titled Systems and Methods for Fluid Flow Based Renewable Energy Generation" and issued to Aeromine Technologies, Inc. This fluid-driven power generation unit is an example of a wind (or other fluid) energy system that utilizes an external set of stationary, mirrored flapped airfoils create a low pressure between them as the wind passes. A central body guides the low pressure to a duct below the unit. Air is sucked into the duct due to the low pressure, and an internal propeller is driven by the pressure and the flow through the duct. The internal flow exits through center body as a vertical jet.

The concept has the potential to operate service free and reliably through an arctic winter with extreme weather, while producing very meaningful energy. The issue of snow and ice throw are solved by the enclosure, making it safe to operate on buildings. However, the enclosure and the open top behind the propeller can allow snow to enter, and possibly pack, the duct system under certain weather conditions.

On ordinary wind turbines, only the rotor system has to be kept clean from ice and snow, since there is not ducting. Many systems to de-ice exist, most using a combination of ice-phobic coatings, dark colors, heating elements etc. In addition, components in the turbine itself may be heated and protected.

Table 1 illustrates example actions to mitigate the adverse effects of cold climate in accordance with various embodiments. Snow or ice buildup can cause overheating of the motor, inefficient operation or imbalance. The system can be configured to detect a motor temperature rise in cold weather conditions or an imbalance in rotor operation. Heat may be applied in this situation to remove snow, icing or other elements affecting rotor operation. Motoring may also be used to blow away snow pack or increase motor temperature. The system may also be configured to maintain a low RPM rotation of the rotor, such as in a low or no-wind situations to maintain constant movement and avoid bearing freeze up.

TABLE 1

Example Unit Modifications That May Be Implemented To Meet Arctic or Other Cold Climate Conditions.

| Environmental challenge | Ordinary Action to mitigate | Example Mitigation |
|---|---|---|
| Overheating of motor due to snow/ice isolation layer/ covering cooling fins | Double casing prevents direct deposit of ice and snow while allowing passive air colling to pass and/or recirculate. | Detecting motor temperature rise in cold weather conditions, the snow packing removal model will remove snow and also heat the motor housing slightly |
| Motor bearing and increased bearing friction | Specify bearing and lubrication for −60 C. Heated bearing. | Maintain low RPM rotation in no wind situations, using a small amount of power. The controller determines to react to critical environmental parameters (temperature, humidity, etc.) and maintain constant movement. |
| Snow packing in duct (above or below) | Manually remove packed snow with broom or similar tools, or wait for the snow to melt. | Monitor the environmental parameters. As soon as snow packing is detected by the packing removal and prevention is performed by motoring the system. |
| Internal rotor over icing | Stop and clean or wait for warmer weather. | Defensive motoring of the rotor system. |

Embodiments disclosed herein may be used with wind harvesting systems, such as those used on or near buildings, characterized by the rotor is partially or fully enclosed by or within a duct system. The rotor can be vertical axis style (or more precisely across the ducted system) or an axial rotor system within the duct system.

Several types of cold winter weather can cause different challenges for a wind harvesting system as described. Temperature, humidity, precipitation, type of precipitation (snow, sleet, freezing rain, hail, etc.), wind and wind direction play a role. Cold temperatures may affect some of the mechanical and magnetic properties of certain components, and embodiments may be implemented that use substitutes for these.

One big issue with cold temperatures is bearing lubrication, and sitting still through a no-wind low-temperature situation can make restart difficult if not impossible. One solution, often used in wind turbines, is heating the bearing. This is generally costly and also generally a fragile solution. Therefore, embodiments disclosed herein for use with a wind harvesting system in a duct, may be implemented to motor the small rotor at a low rotational speed using modest power to avoid the rotor sitting still for long periods of time. This can be combined with the application of heat to enhance the effects.

This motoring mode may utilize a different topology than normally used in wind harvesting electrical power systems, as described herein. Particularly, systems and methods disclosed herein may monitor the environment for the presence of a possibly critical situation and take steps to address the situation such as by rotating the generation system's rotor as noted above, applying heat or a combination of the foregoing. This can be used, for example, to clear blockage (e.g.

caused by snow or other matter), avoid or deter icing and maintain rotor rotation to avoid bearing freeze-up.

The conditions for cold temperature and wind can be gathered from various sources and communicated to the turbine controller. For example, environmental data can be gathered from third-party sources or local sensors may be provided and connected to the turbine controller so that the turbine controller collect that information and use it to determine whether remedial action is required. If a critical situation is occurring, performance analysis of the rotor will reveal if the situation needs additional mitigation. In general, the rotor sits still as weather occurs, the system starts motoring rotation to keep the bearing active and avoid a hard freeze. If the system is already rotating, either driven by wind or motored, the performance can be evaluated as compared to expected conditions and a decision to increase motoring speed may be acted upon to increase the mitigation measure. If the electrical topology implementation allows, the rotational direction can be varied over time, combined with different amplitudes and periods of actuation.

Cold weather combined with precipitation, can present additional challenges. For example, freezing rain is generally a challenge for buildings, vegetation, wind turbines, utility lines and many other structures. The iced rain accumulates on the surface and weighs down the structures. For wind turbines, ice can change the aerodynamic performance as well as cause rotor imbalance leading to subsequent shut down. The same can happen to rooftop equipment such as ventilation fans. In the utility industry, the severity of icing events is judged by a set of weather parameters summarized in the Sperry-Piltz Ice Accumulation table.

Rain and ice rain is not expected to change the outer surface's performance driving the inner propeller, but it is likely the internal propeller could suffer ice accumulation and subsequent output reduction, should the wind direction be such that rain can enter the system (e.g., from the back and the top in the systems described with reference to FIGS. 7 and 8). In normal control mode, the rotor may not be operating, and ice can accumulate asymmetrically on the rotor. As the wind direction changes and the rotor attempts to start, data from a vibration sensor is interpreted by the rotor controller and the imbalance detected. The rotor controller may shut down the system if significant imbalance challenges the system (e.g., imbalance greater than a determined threshold). In order to avoid this situation, the rotor can be set to be motored continuously or periodically by the control system. The process for rain and freezing rain may be similar to that for cold temperature mitigation, except the operational mitigation may use different rotational speeds and power usage patterns.

Depending on the power generation unit within which the control system is implemented, when the unit is in power production mode, the airflow of the wind passing through the duct system is likely higher than the given drop rate of the precipitation, depending on the weather system. Generally, rain, freezing rain and small hail (<1 inch) fall at a rate of up to about 12 m/s. The smaller the droplets the smaller the velocity. So, in certain situations this is inherently exceeded by normal operation of the power generation unit, which can avoid issues. For the motoring situation, a 100% prevention mechanism, would be to motor to produce a flow velocity in the duct exceeding the rain drop fall velocity. This is easily predicted or determined (e.g., using weather sensor data) and the setpoint of the system operation. A defensive flow pattern sufficiently strong to keep the duct-work clear is driven by wind and power generation or in adverse conditions where the rotor is motored by using power.

As compared to sleet and freezing rain, snow fall speeds are much lower and generally below 2 m/s, so in the case of snow fall the speed is driven by wind. Mitigation is again similar to the rain, but different setpoints for mitigation may be required.

Generally speaking, and depending on the power generation unit, only a narrow set of wind and precipitation may actually expose the rotor system directly to freezing rain, sleet, etc., so direct freezing rain deposit may not be particularly likely to occur. However other weather conditions such as high humidity and cold temperatures or super cooled fog can cause ice accumulation, regardless. The control system may be configured to evaluate sensor data (or third-party data) to determine whether such conditions are occurring.

In various embodiments, the decision making can be complimented with icing sensors. An example of such sensors is from the aviation industry where a vibrating probe changes characteristics during an icing event. Other probes, often used in large wind turbines, are based on optical detection systems. This input can be added to the system.

Should the snow be "wet", another challenge is snow packing. Snow does not affect the structure but it can potentially pack inside the stagnation box and duct from the front as well as from the top behind the center body. Based on weather assessment, a mitigation technique can be implemented by switching occasionally to motor mode to literally blow the snow out of the system. For hard packing, high power and flow rates can be obtained and blow open even a completely closed duct as the power of the fan is also associated with creating an over-pressure.

Embodiments of the systems and methods disclosed herein may be used with any of a number of different wind-based power generation units to help mitigate the effects of colder temperatures and precipitation on the units. As noted above, wind-based power generation units rely on wind to generate electricity. These can be implemented as relatively small-scale wind energy system designed to generate electricity from wind power. While specific designs and mechanisms may vary, these units typically include a turbine structure that may include a rotor, blades, a generator, a housing or enclosure, and support structures. The unit may be designed specifically for installation on rooftops to harness wind energy in urban or residential environments, or for other installation locations. As wind blows across the rooftop (or other installation location), the turbine's rotor and blades rotate to capture the energy from the moving air. When wind flows over the turbine's blades, it creates lift and causes the blades to rotate. The number of blades and their shape may vary depending on the specific design. The rotating blades convert the kinetic energy of the wind into mechanical energy. The rotating blades are connected to a generator that uses coils and magnets to produce an electrical current as a result of the rotation. As the blades rotate, they spin the generator's rotor, and the generator converts the mechanical energy into electrical energy. Monitoring and control systems may be included to optimize system performance. These systems can include wind sensors to measure wind speed and direction, as well as control mechanisms to adjust the turbine's orientation for optimal wind capture, depending on the application.

One example of a wind system that can be used on or near buildings (or in other locations) is that disclosed in U.S. Pat. No. 11,391,262, to Westergaard, titled Systems and Methods for Fluid Flow Based Renewable Energy Generation" and issued to Aeromine Technologies, Inc. This patent is incorporated by reference herein in its entirety. Other examples of wind systems used on or near buildings, can be found in US Application Numbers US2021381491, US2010166547A1, US2007176431A1, US2016084227A1, and US2010126086A1 and in GB2468881A, CH704383A2, each of which are also incorporated herein in their entirety. These systems may be subject to the same cold-weather issues as the Aeromine system and thus and may also benefit from the systems and methods disclosed herein.

Example turbine controllers that may be used with such fluid-driven power generation systems are now described. It is understood that when an interconnection of the electrical system is a grid, this can be a utility grid, a micro grid or any other configuration that energizes the delivery side of a wind energy system, weather this is an AC or a DC system. For the latter, the power offtake is often configured differently from what is shown.

FIG. 1 illustrates a typical turbine controller that includes a generator assembly 102 and a power converter 104 in accordance with various embodiments. The power converter includes a diode bridge 112 to rectify the power and a power inverter 114 to invert the power to AC. In smaller wind turbines the converter can include a simple rectifier, whereas in larger turbines the rectifier is an active converter. The example of FIG. 1 also includes contactors that default the system to shunt resistors 116 in case of grid fall out or other operational faults. This is a very typical small wind turbine configuration, for fail-safe operations.

The electrical generator assembly 102 in wind turbines is typically an induction generator, which operates based on the principles of electromagnetic induction. It includes a stationary component called the stator and a rotating component called the rotor. The stator (not shown) is a stationary part of the generator and is made up of wire coils wound around an iron core. These coils are arranged in a specific configuration to form three phases, often referred to as a three-phase generator. The stator produces a rotating magnetic field when electrical current passes through the coils. The rotor (not shown) is the rotating part of the generator and is mounted on the rotor shaft. It consists of a magnet or magnets that create a magnetic field.

Some applications, such as that pictured in the example of FIG. 1 use a permanent magnet generator. A key component of a permanent magnet generator is the permanent magnets. These magnets, usually made of materials such as neodymium or ferrite, have a constant magnetic field that does not require an external power source. Often neodymium is preferred over ferrite in cold climates as ferrite risks demagnetization in extreme cold. The magnets are fixed to the rotor of the generator. The rotor is the rotating component of the generator that holds the permanent magnets. As the rotor rotates, the permanent magnets create a rotating magnetic field around them. The number and arrangement of magnets depend on the generator design.

The magnetic field from the spinning rotor interacts with the coils in the stator. As the magnetic fields from the rotor interact with the stator, this induces an electric current in the wire coils of the stator. According to Faraday's law of electromagnetic induction, the relative motion between the magnetic fields and the wire coils induces a voltage across the coils. The induced voltage in the stator coils is typically alternating current (AC). This AC current is then converted into usable electrical power through a power conditioning system. The power conditioning system consists of components such as transformers, inverters, and rectifiers, which convert the AC power to the desired voltage and frequency for transmission and distribution. The electrical power generated by the wind turbine generator is often connected to an electrical grid. This allows the generated power to be distributed and used by consumers. The wind turbine generator is connected to the grid through power lines and associated control and protection equipment. It is important to observe that this configuration does not allow reverse power flow, meaning power is taken from the utility side and used to rotate the generator as a motor. The diode bridge 112 prevents reverse current flow, making the system mono directional.

FIG. 2 illustrates another example of a turbine controller that includes a generator assembly 102 and a power converter 104 in accordance with various embodiments. The example illustrated in FIG. 2 includes a generator connected to a grid with a bidirectional motor controller. This example also shows contacts that default to the system shunt resistors 116 in case of a grid fallout. In this example configuration, power can flow both from the generator assembly 102 to the utility grid, or from the utility grid to generator assembly 102. Power supplied to generator assembly 102 can be used to motor or drive generator assembly 102 (as a motor) instead of its normal operation as a generator.

FIG. 3 illustrates another example of a turbine controller that includes a generator assembly 102 and a power converter 104 in accordance with various embodiments. The example illustrated in FIG. 3 shows a generator assembly 102 with a connection to the grid and a mono-directional generator controller. This example illustrates a configuration that can include switches to disconnect the generator assembly 102 from the converter and connect the generator assembly 102 to an AC power source 120. AC power source 120 can be used to drive the generator in a motor mode. AC power source 120 can include, for example, the utility grid, a micro grid, a battery with a power converter, a capacitor bank with a power inverter, or any other source that can produce AC power suitable to drive the generator assembly 102 as a motor.

FIG. 4 illustrates another example of a turbine controller that includes a generator assembly 102 and a power converter 104 in accordance with various embodiments. The example illustrated in FIG. 4 also shows a generator assembly 102 with a connection to the grid and a one-directional generator controller. This example illustrates a configuration that can include switches to disconnect the generator assembly 102 from the converter and connect the generator assembly 102 to an AC power source 120. In addition to AC power source 120, this example includes a variable speed motor drive 122 that can drive the generator assembly 102 in a motor mode at a selected speed (e.g., based on weather conditions). AC power source 120 can include, for example, the utility grid, a micro grid, a battery with a power converter, a capacitor bank with a power inverter, or any other source that can produce AC power suitable to drive the generator assembly 102 as a motor.

FIG. 5 illustrates another example of a turbine controller that includes a generator assembly 102 and a power converter 104 in accordance with various embodiments. The example illustrated in FIG. 5 also shows a generator assembly 102 with a connection to the grid and a one-directional generator controller. This example illustrates a configuration that can include switches to disconnect the generator assembly 102 from the converter and connect the generator assembly 102 to an AC power source 120. This example illustrates a configuration that can include switches to disconnect the generator assembly 102 from the converter and connect the generator assembly 102 to a DC power source 130. DC power source 130 can be used to drive the generator in a motor mode. DC power source 130 can include, for example, a battery, a capacitor bank, or any other source that can produce DC power suitable to drive the generator assembly 102 as a motor.

FIG. 6 illustrates an example turbine control system 200 that can be used to control a generator (e.g., generator assembly 102) in accordance with various embodiments. This example turbine control system 200 includes a turbine control circuit 210 that receives information from sensors 152 to control a generator control circuit 162 (e.g., such as those control circuits described above with reference to FIGS. 1-5) which in turn can control rotation of the rotor of motor generator assembly 102.

In this example, sensors 152 include in this example include weather sensors 242, blockage sensors 244, airflow sensors 246 and balance sensors 248. Sensors 152 may also include other sensors 254 is appropriate to determine whether to control the generator (e.g., generator assembly 102) of a wind power generation unit. Weather sensors can include, for example, temperature, pressure, humidity, wind, precipitation, and other sensors that can be used to provide data to turbine control circuit 210 to determine current and possibly predicted weather conditions in the vicinity of the wind power generation unit.

Blockage sensors 244 may include, for example, optical or airflow sensors within an airflow channel of the wind power generation unit to determine whether the airflow channel is blocked such as, by an accumulation of snow or other impediments. Airflow sensor 246 may be included to measure the airflow within the wind power generation unit. This information might be compared with weather data to determine whether the system is operating optimally. For example, for a given wind speed and wind direction, certain levels of airflow would be expected to be measured by airflow sensor 246.

Sensors 152 and generator control circuit 162 can communicate with turbine control circuit 210 via a wired or wireless communication interface. Although sensors 152 and generator control circuit 162 are depicted as communicating with turbine control circuit 210, they can also communicate with each other as well as with other entities.

Turbine control circuit 210 in this example includes a communication circuit 201, a decision circuit 203 (including a processor 206 and memory 208 in this example) and a power supply 212. Components of turbine control circuit 210 are illustrated as communicating with each other via a data bus, although other communication in interfaces can be included.

Processor 206 can include one or more GPUs, CPUs, microprocessors, or any other suitable processing system, which may be implemented using one or more single core or multicore processors. The memory 208 may include one or more various forms of memory or data storage (e.g., flash, RAM, etc.) that may be used to store sensor data, instructions and variables for processor 206 as well as any other suitable information. Memory 208, can be made up of one or more modules of one or more different types of memory, and may be configured to store data and other information as well as operational instructions that may be used by the processor 206 of the turbine control circuit 210.

Although the example of FIG. 6 is illustrated using processor and memory circuitry, as described below with reference to circuits disclosed herein, turbine control circuit 210 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up turbine control circuit 210.

Communication circuit 201 includes either or both a wireless transceiver circuit 202 with an associated antenna 214 and a wired I/O interface 204 with an associated hardwired data port (not illustrated). As this example illustrates, communications with turbine control circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by assist-mode detection/activation circuit 210 to/from other entities such as sensors 152 and vehicle systems 158. It is understood that having a system with communication connectivity, weather information and weather data can be received by the system and used as weather data, either directly or indirectly. For example, virtual sensor inputs can be created from such communication and supplied to the system as weather sensors 242, or it can be used directly as other 254.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and NiH$_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

During operation, turbine control circuit 210 may receive information from the various sensors 152 to determine whether any conditions exist that may warrant motoring the generator are taking other actions to mitigate poor performance that might be caused by the monitored conditions such as, for example, cold-weather and precipitation. Communication circuit 201 can receive information from the various sensors 152 in this information can be processed by processor 206 to determine whether action is required. For example, as described above, certain weather conditions may be detected, and as a result of such detection, turbine control circuit 210 can generate and send signals to turbine generator control circuit 162 to control motor generator assembly 102.

For instance, temperature thresholds can be set and turbine control circuit 210 can be configured to compare measured temperature (e.g. via weather sensors 242) against the set threshold to determine whether the generator assembly 102 should be motored to prevent freeze up of the bearings. Turbine control circuit 210 can also determine whether the rotor of generator assembly 102 is rotating on its own (e.g., being driven by wind pressure such as in normal operation), in which case motoring generator assembly 102 may not be required. Accordingly, if the rotor of generator assembly 102 is rotating at a sufficient rotational speed due to normal operation caused by current wind pressure, this would generally be sufficient to avoid bearing freeze up and motoring generator assembly 102 may not be required. In some embodiments, a minimum threshold speed may be set (and may be temperature dependent) to mitigate concerns for bearing freeze up, and the current rotational speed of the rotor of generator assembly 102 can be compared to this threshold to determine whether motoring (or additional motoring) is required to achieve this speed. Current rotational speed may be determined directly (e.g., encoders at generator assembly 102) or indirectly (e.g., via windspeed generated by the generator).

As described above, systems and methods may be implemented to motor a rotor of a generator of the power generation unit to mitigate the effects of one or more winter weather conditions on the power generation unit. For example, a turbine controller can be used to motor the generator at a fixed rotational speed, a selected rotational speed of a plurality of fixed rotational speeds, a partially variable rotational speed or a fully variable rotational speed. In some embodiments, systems and methods can be implemented to effect a temporally varying rotational speed pattern that may be particularly beneficial to remove undesired effects of the weather conditions. For example, pulsing the rotor (e.g., on/off or varying the speed) may be more effective at removing blockages than providing a constant airflow. Also, variable speed may be used to shed accumulation or it may be used to decrease risk of accumulation, by simply following a speed pattern other than that determined by optimal dry weather.

As also noted above, examples may be implemented in which the rotor can be motored in one direction or in both rotational directions. For example, motoring the rotor in the same direction as the rotor rotates during normal operation (in response to wind conditions) can allow the system to facilitate the flow of winter precipitation (e.g., snow, sleet, freezing rain) through the flow path of the energy harvesting system (e.g., through an enclosed or semi-enclosed duct). Motoring the rotor in the opposite direction may be useful to clear blockages resulting from an unwanted winter precipitation event that may be forming or may have formed at or near the flow-path intake of the fluid-driven power generation unit.

Power used to motor the rotor of the generator can come from a variety of different sources. For example, a grid connected generator may use power from the grid to motor the generator. As another example, power from the generator itself may be tapped to provide power to motor the generator to achieve additional rotational velocity. As yet another example, power from a power supply (e.g. power supply 212) may be provided to motor the generator.

Aside from or in addition to temperature considerations, precipitation may be monitored to determine whether to motor generator assembly 102 to avoid blockages caused by winter precipitation events such as snow, sleet, freezing rain or other winter precipitation. To more clearly illustrate this example mode of operation, an example of a wind-power generation unit with which the systems and methods disclosed herein may be implemented is briefly. This example is an embodiment as disclosed in that disclosed in U.S. Pat. No. 11,391,262, which as noted above is incorporated by reference herein in its entirety. This is just one example, and as also noted above, the systems and methods disclosed herein may be implemented with any of a number of different wind-power generation units.

In this example, as seen in FIGS. 7 and 8 (from FIGS. 1 and 2 of U.S. Pat. No. 11,391,262), FIG. 7 illustrates an example fluid-driven power generation unit in accordance with various embodiments and FIG. 8 illustrates a perspective side view of the example fluid-driven power unit of FIG. 7 in accordance with various embodiments. Referring now to FIGS. 7 and 8, the example fluid-driven power generation unit 300 includes airfoils 312, a top plate 310, a bottom plate 311, a body 322 and a generator assembly module 323. The unit is positioned such that the fluid flow (e.g., wind, water or other fluid) impacts the unit in the direction of the arrow.

This example includes a plurality of airfoils 312 positioned at the sides of the unit. This example includes four airfoils 312, configured as a set of two airfoils 312 on each side of the unit (only one airfoil 312 is numbered to avoid clutter in the drawing), although other quantities of airfoils 312 may be included. Airfoils 312 on each side are arranged two per side in a configuration such that one airfoil 312 is forward and to the inside of the other airfoil 312. Airfoils 312 are arranged with the trailing portion of the inner airfoil 312 overlapping the leading edge of the outermost airfoil. The outer, rear airfoil 312 is positioned with a larger angle of attack relative to the forward, inner airfoil 312. Note, for purposes of discussion only, the windward side of the unit is designated as the forward side and the leeward side is referred to as the back or back side. Also, the upper side of the unit as oriented in the diagrams is referred to as the top, and the lower side is referred to as the bottom, although the unit can be configured for and installed in other orientations. Also, for ease of discussion, the fluid is referred to as wind or air, but it can be understood that the fluid is not limited to wind or air. For example, in can include water, atmospheric, or non-atmospheric gas.

Body 322 in this example presents a solid curved face or pointed surface to the wind in this example such that airflow is directed by body 322 to either side, increasing airflow over airfoils 312. Body 322 has a "U-shaped" cross section, with some or all of the back side of body 322 being open. As discussed in detail below, this allows airflow to flow up from generator assembly module 323 and out through the back of body 322, ultimately exiting the unit on the back side. The sides of body 322 (i.e., the arms of the U) may be parallel to one another, or they may angle or taper inward or outward, which affects fluid flow through the unit.

Top plate 310 and bottom plate 311 may be included to help confine fluid flow within the unit. Bottom plate 311 may further provide separation between fluid flow entering generator assembly module 323 from below and fluid flow exiting body 322, above. Although top plate 310 and bottom plate 311 are illustrated as planar plates, these plates can comprise curved or other non-planar surfaces, examples of which are described below.

Airfoils 312, whose leading edges face the wind, produce a low-pressure potential, Cp(x) to the rear of body 322. This low-pressure potential drives an internal flow stream from a separate inlet that is positioned below body 322. A turbine (not shown in FIG. 1) is included in generator assembly module 323. The low-pressure potential created within the unit by airfoils 312 draws air from the lower inlet through generator assembly module 323 and out the open rear portion of body 322. This airflow through generator assembly module 323 rotates the turbine blades, which are attached to a generator shaft (also not shown in FIG. 1), to generate electricity.

In various embodiments, increasing or decreasing the internal flow rate only affects the external flow stream in a marginal way. In some designs, the ejection of the internal flow stream can result in positive stimulation of the external flow and increase the performance of downstream units.

As seen in FIGS. 7 and 8, embodiments may be implemented in which at least the forward portions of generator assembly module 323, and body 322 (not shown in this diagram) are positioned forward of airfoils 312. The rear opening portion of body 322 is positioned between forward airfoils 312.

In various embodiments, the inlet can be oriented into the wind direction, but not necessarily in a fixed position relative to the rest of the unit, e.g. the top or bottom plate. In some example configurations, for example configurations in which the front inlet area is the same as the internal turbine rotor area (internal turbine rotor area can be a function of turbine diameter discussed with reference to FIG. 9), it may be desirable to turn the inlet into the wind in order to secure the effective inlet area is not reduced (or to maximize the effective inlet are). In other words, it may be desirable for the wind to enter the inlet area at or near a perpendicular angle. As such, one or more configurations can be designed with the inlet at a variety of angles off the center line of the unit. In some examples described herein, the unit can include one or more mechanisms, e.g., actuators (e.g. to rotate, translate, and/or tilt the duct or inlet), sensors (e.g. for sensing wind direction or sensing power output or rotational speed of the generator), and processing components. It can be understood that the actuator can be configured to actuate the inlet, duct, or whole unit, into more optimal locations (e.g., by rotation, translation, tilting, or otherwise, and based on one or more values of the sensors) so that an effective area of the inlet is maximized as the direction of the wind may change. It can be understood that the mechanism can include a rail, track, rack and pinion, or other mechanism for translational movement coupled to the fluid-driven power unit. It can also be understood, that in some configurations, e.g., if the inlet is larger than the internal turbine rotor area, such mechanisms may not be necessary.

FIG. 9 illustrates an exploded view of an example generator assembly that may be included in the fluid-driven power generation unit of FIGS. 7 and 8 in accordance with various embodiments. Referring now to FIG. 9, generator assembly module 132 includes a turbine rotor assembly 421, a stator 422 and a rotor 423. Rotor 423 includes a series of magnets mounted with alternating polarities about the perimeter of the device. Rotor 423 includes a shaft that is mounted to turbine rotor assembly 421 such that rotation of turbine rotor of turbine rotor assembly 421 causes rotor blades of turbine rotor assembly 421 to rotate. Stator 422, which remains stationary, can rectify the skewing behind the turbine rotor assembly 421. Stator 422 can include a number of airfoils optimized for this purpose. The blades of stator 422 can be supported by a casing 460, in which the rotor 423 is enclosed inside the housing 425 and embedded in the generator assembly module 323 (see for example FIG. 7).

The generator assembly can include a nose cone 465. The nose cone 465 can smooth the aerodynamic flow around the casing 460 and the turbine rotor blades. The diameter of the casing 460 and nose cone 465, referred to as the hub diameter, and the diameter of the turbine can be carefully matched to the overall system performance. In essence the ratio of the turbine diameter to the hub ratio can controls the pressure drop that the turbine can produce against the low-pressure originating in the vertical airfoils sets and the over-pressure originating in the inlet chamber, at any given wind speed.

Stator 422 can be stationary within the housing (e.g. with respect to the housing) and can surround rotor 423. When turbine rotor blades of turbine rotor assembly 421 cause rotor 423 to rotate (with its magnets) within stator 422, rotor 423 produces a rotating magnetic field within stator 422. Stator 422 includes a plurality of coils about its perimeter that convert the rotating magnetic field generated by rotor 423 into an electric current. In the illustrated example, turbine rotor assembly 421 includes five rotor blades, but in other embodiments, turbine rotor assembly 421 may include a different quantity of rotor blades.

Having thus described one example fluid-driven power generation unit with which systems and methods for cold weather operation disclosed herein may be implemented, an precipitation mode is now described. As noted above, in embodiments, the system may be configured to motor the generator to keep the airflow (or more generally, fluid-flow) path clear of participation.

FIG. 10 illustrates a cross-sectional view of an example of a precipitation mode in the context of the fluid-driven power generation unit 300 in accordance with various embodiments. As this example illustrates, the internal flow stream driven by the wind pressure, carries precipitation/snow past the propeller to exit behind the unit. The precipitation passing through is convected downstream with the wind. In the case of no wind, the same flow pattern can be established if the rotor is motored, and thus keep the ducts clean and free of snow build up. Note the flow direction can be reversed by reversing the rotational direction of the rotor.

If the rotor of generator assembly 102 (e.g., rotor of generator assembly module 132) is rotating at a sufficient rotational speed due to normal operation caused by current wind pressure to avoid snow or other precipitation blocking the airflow path, motoring generator assembly 102 would not typically be required. On the other hand, if the rotor of generator assembly 102 is not rotating due to wind pressure, or is not rotating fast enough to cause precipitation to pass through the system (preferably without any appreciable buildup), turbine control circuit 210 may determine that additional rotational velocity should be used to keep the path clear. Appreciable buildup may be defined as an amount of buildup that inhibits performance of the unit by a determined amount.

The amount of rotational velocity targeted to be achieved, whether wholly by motoring the generator or by motoring to create additional velocity on top of that created by the wind, can be determined to achieve an amount of fluid flow within the unit to clear the precipitation or other blockage (e.g., leaves, dust, seaweed, algae (the latter two in the example of a water-flow-based implementation).

FIG. 11 illustrates a cross-sectional view of another example of a precipitation mode in the context of the fluid-driven power generation unit 300 in accordance with various embodiments. This example illustrates a fluid-driven power generation unit 300 with a semi-closed duct system around an internal rotor system. The internal duct system has been partially or fully blocked by piled up snow. By motoring the rotor, snow can be loosened, removed and blown away, with or without ambient wind to rotate the rotor.

FIGS. 12 and 13 illustrate an example fluid-driven power generation unit 300 mounted at least partially behind a portion of the building facade 404, such as, for example, a building parapet. In this example, fluid-driven power generation unit 300 may utilize a semi-closed duct system and an internal rotor. The arrows in the figures indicate indicating wind flow. Precipitation may be taken over the building facade 404 and into the duct, following the flow pattern shown by the arrows in FIG. 13. As this illustrates, the portion of facade 404 could make the effects of the precipitation better or worse, and it may be more difficult to blow accumulated snow 411 for example (or other accumulated debris), out of the system. As illustrated in the example of FIG. 13, the rotor can be motored to move the fluid in an upward direction until the channel is reopened.

FIG. 14 is a diagram illustrating an example process for mitigating the effects of cold weather or precipitation in accordance with various embodiments. As with the above examples, this example process is described in terms of the example Aeromine fluid-driven power generation unit 300. However, after reading this description, one of ordinary skill in the art will understand how to apply the technology disclosed herein with other fluid-driven power generation units.

Referring now to FIG. 14, as described above, information from weather sensors 532 (e.g., part of sensors 152 of FIG. 6) and other weather data 534 may be captured and received by the turbine controller (e.g., turbine control circuit 210 of FIG. 6). Weather sensors 532 may be mounted or otherwise included with fluid-driven power generation unit 300, or they may be separate sensors that may be mounted on or near the building or other location at which the fluid driven power generation unit 300 is operating. Weather sensors 532 may serve an individual fluid-driven power generation unit 300 or the sensor package may serve multiple fluid-driven power generation units 300. Weather sensors 532 may communicate with the turbine controller via wired or wireless communications.

Weather data 534 may be received, for example, via the Internet or other external data source, such as third-party weather data that can be obtained for the location where the fluid-driven power generation unit 300 (or units) is located.

At operation 540, the turbine controller uses the data received from weather sensors 532, third-party weather data, or both, to analyze the weather. As described above, the turbine controller can determine relevant weather data such as, for example, current temperature, temperature trends, current precipitation, forecasted precipitation, wind velocities and wind directions, and so on.

At operation 544, turbine controller evaluates this data to determine whether a critical situation is predicted. This can include, for example, determining whether temperatures are near, at or below a given freeze-temperature threshold below which rotor freezing may occur or may be at risk of occurring. In some embodiments, the freeze-temperature threshold may be set one, two, three, four or more degrees greater than the freeze temperature to provide a safety buffer with the system. Determining whether a critical situation is predicted may also include determining whether snow, sleet, freezing rain or other precipitation is falling that may impact the operation of the system such as by disturbing the rotor-blade shape, causing rotor imbalance, clogging or at least partially obstructing the flow path and so on.

If a critical situation is not predicted the system continues to analyze the weather data at operation 540. In some embodiments, if a critical situation is predicted the system may move directly to operation 550 where the turbine controller determines a corrective action to be taken (such as motoring the generator) to mitigate the effects of the cold temperatures or adverse conditions.

In other embodiments, such as the example illustrated in FIG. 14, if a critical situation is predicted, the process may continue at operation 546 where the controller analyzes the performance of the fluid-driven power generation unit 300 to determine whether there is in fact a critical situation (as seen at operation 548). For example, the system can look at performance data 536 to analyze the performance of the system. This can include, for example, a comparison of the current system output as compared to nominal or projected output for the given wind conditions and wind direction. A decrease in output (e.g., below a determined nominal output range for the unit) may indicate performance is impacted based on the current weather conditions. As another example, an accelerometer or vibration sensor may be used to determine whether the rotor is out of balance, which may indicate an accumulation of precipitation (e.g., icing) on the rotor or rotor blades. As yet another example, optical, ultrasonic or other sensors may be used to detect the presence of accumulated snow or other precipitation or other materials within the flow channel. In some embodiments, a combination of the foregoing may be used to analyze generator or generation unit performance.

At operation 548, the turbine controller determines whether a critical situation exists based on the results of the performance analysis at operation 546. If a critical situation does not exist, normal operations continue (block 570) in the system continues to analyze the weather at operation 540. On the other hand, if at operation 548 a critical situation is detected (or it is determined that the system is close to a critical situation) the turbine controller determines action to be taken at operation 550. The appropriate action to be taken may vary depending on the performance issue or whether condition detected. Examples of corrective action are shown in block 560. In this diagram these examples include maintaining system operation at 562, blockage clearing at 564 or anti-icing at 566. Maintaining system operation at 562 may include, for example, motoring the generator or monitoring rotor rotational velocity to ensure that precipitation continues to be blown through the system and does not accumulate. Blockage clearing operation at 564 may include, for example, motoring the generator to achieve sufficient rotational velocity to force (e.g., below) the blockage away from or out of the system. Anti-icing 566 may include, for example, motoring the generator at sufficient velocity to ensure that bearing freeze up can be avoided, depending on temperatures. In each of these examples, the system can evaluate rotational velocities or fluid flow rates (e.g., cfm) to determine whether adverse conditions may occur, and whether motoring should be utilized to increase fluid flow rates to avoid adverse conditions occurring.

Various embodiments described above supply power to the generator of the fluid-driven power generation unit to motor the generator to mitigate the possible effects of an adverse winter weather condition such as cold temperatures, snow, sleet, freezing rain or a combination thereof. As described above, the electrical systems to motor the rotor may be configured to motor the rotor in one direction or in both directions. This may be useful to assist with different issues caused by winter weather conditions. For example, motoring the rotor in the same direction as the rotor rotates as a result of wind power can allow the system to ensure that any precipitation sucked into the flow path Any of the above systems which can operate in fixed rotational speeds, a set of selected rotational speeds, a partially variable speed or a fully variable speed Any of the above systems which can operate in fixed rotational speeds, a set of selected rotational speeds, a partially variable speed or a fully variable speed following a temporal variating rotational speed pattern beneficial to removing the undesired weather effects In some embodiments, heating coils or other heating elements can be included to mitigate the impacts of cold-weather or precipitation with the unit. For example, heating elements may avoid bearing freeze up or may be used to melt accumulations of ice on the rotor that would otherwise cause an imbalance. Of course, motoring the generator also produces some amount of heat. Therefore, embodiments may combine the motor-generated heat with heat from the heating element in the vicinity of the motor to keep it warm to avoid freeze up. Similarly, heating coils along or positioned about the casing or at the entry to the fluid flow path (to heat air as it enters the unit) may also provide heat.

The application of heat however could have adverse effects as it may make it more difficult to clear snow from the fluid-flow path. For example, a dry and light snow may be relatively easy to blowout of the fluid flow path. The application of heat may make this otherwise light and fluffy snow heavy and sticky and therefore more difficult to clear from the fluid-flow path. Embodiments may be implemented to determine whether it may be beneficial or detrimental to apply heat as part of the process before the application of heat is utilized. For example, in temperatures at or near the freezing point, snow may already be wet and heavy and the application of heat may be useful in melting or preventing the buildup of any accumulation. On the other hand, temperatures well below freezing may create situations where it is difficult if not impossible for a small heating element to effectively melt any snow accumulations.

FIG. 15 illustrates a cross-sectional view of an example of including an active heating component with the fluid-driven power generation unit 300 in accordance with various embodiments. This example illustrates a system that includes a fan system 462 to circulate air to prevent snow and ice build up. The fan system can include heating coils or other heating elements (not shown), so the air is heated as it is circulated by fan system 462. The heating elements may be selectively energized so that fan system 462 can operate with or without the application of heat to warm the air that is flowing through the system. As described above, various considerations may be taken into account when determining whether heat would be beneficial or detrimental to cold weather operation. In implementations incorporating a fan system, the fan and its heating elements (if any) may be controlled by a control system such as, for example, turbine control circuit 210 as illustrated in FIG. 6.

FIG. 16 illustrates a cross-sectional view of another example of including an active heating component with the fluid-driven power generation unit 300 in accordance with various embodiments. This example illustrates a system that includes a fan system 464 that circulates air to prevent snow and ice to build up. The fan system can include heating elements, so the circulated air is hot. The fan system is connected to a duct system around or near critical elements, including the rotor duct, motor, rotor blades (which may be hollow), etc. As described above, various considerations may be taken into account when determining whether heat would be beneficial or detrimental to cold weather operation. In implementations incorporating a fan system, the fan and its heating elements (if any) may be controlled by a control system such as, for example, turbine control circuit 210 as illustrated in FIG. 6.

FIG. 17 illustrates a cross-sectional view of yet another example of including an active heating component with the fluid-driven power generation unit 300 in accordance with various embodiments. In this example, heating elements 466 can be positioned within or disposed upon various components prevent the accumulation of or to remove snow and ice, with or without blowing requirements. Heating elements 466 can be embedded inside the structure or be placed on the outside of the structure. In the latter case, one practical implementation may include heating blankets. Heating elements 466 can be on rotor blades, in ducts, on large passive or active surfaces as well as on the motor system and in the electrical cabinets.

The various fans and heating elements described above may be selectively energized (as may the fans themselves) so that a fan can be activated and deactivated, can be speed controlled, and can be controlled to operate with or without the application of heat to warm the air that is flowing through the system. The heating elements can be controlled to be turned off and on or to operate at a given temperature or other level. As described above, Various considerations may be taken into account when determining whether heat would be beneficial or detrimental to cold weather operation. In implementations incorporating a heating system (e.g., fan system, heating elements or both), these components may be controlled by a control system such as, for example, turbine control circuit 210 as illustrated in FIG. 6.

The heating elements may include any of a number of different types of heating elements, such as, for example, resistive heating elements (e.g., made of coiled resistance wire) or positive temperature coefficient heating elements.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software (such as for implementation on processor 206, e.g.), these software elements can be implemented to operate with a computing or processing component capable of carrying out the functionality described with respect thereto. One such example computing component is shown in FIG. 18. Various embodiments are described in terms of this example-computing component 600. After reading this description, it will become apparent to a person skilled in the relevant art how to implement the application using other computing components or architectures.

Referring now to FIG. 18, computing component 600 may represent, for example, computing or processing capabilities found within a self-adjusting display, desktop, laptop, note-book, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 622, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for mitigating a cold climate impact on a fluid-driven power generation unit, comprising:
   a turbine control circuit receiving data indicating at least one weather condition at the fluid-driven power generation unit;
   the turbine control circuit analyzing the received data to determine the at least one weather condition;
   the turbine control circuit assessing a potential impact of the determined at least one weather condition on the fluid-driven power generation unit;
   the turbine control circuit analyzing performance of the fluid-driven power generation unit; and
   the turbine control circuit controlling a generator of the fluid-driven power generation unit, motoring a rotor of the generator and thereby mitigate the potential impact of the determined at least one weather condition on the fluid-driven power generation unit;
   wherein the determined at least one weather condition comprises a winter precipitation event at the fluid-driven power generation unit and
   wherein controlling the generator comprises motoring the generator to achieve at least minimum rotational speed: to avoid precipitation building up in a fluid flow path of the fluid-driven power generation unit; or to avoid rotor bearing freezeup when the ambient temperature is below a designated temperature.

2. The method of claim 1, further comprising determining a current rotational velocity of the rotor of the generator and wherein motoring the generator to achieve at least minimum rotational velocity is performed only when the current rotational velocity of the rotor of the generator is below the minimum rotational velocity.

3. The method of claim 1, wherein the turbine control circuit switches the generator to a power source motoring the rotor of the generator, and wherein the power source comprises at least one of a power grid to which the fluid-driven power generation unit is connected, and a battery.

4. The method of claim 1, further comprising the turbine control circuit activating an active heat source to further mitigate the potential impact of the determined at least one weather condition.

5. The method of claim 1, wherein motoring the rotor of the generator comprises causing the rotor to rotate at a fixed rotational speeds or a selected one of a set of fixed rotational speeds.

6. The method of claim 1, wherein motoring the rotor of the generator comprises causing the rotor to rotate at a temporally varying rotational speed.

7. The method of claim 1, wherein the turbine control circuit further determines a direction to rotate the rotor based on the at least one weather condition.

8. A turbine controller for a fluid-driven power generation unit that comprises a ducted rotor system, the turbine controller comprising:
   an electrical circuit comprising a power input for connection to a power source and a power output to a motor of a rotor of a generator of the fluid-driven power generation unit;
   a plurality of sensors; and
   a turbine control circuit comprising an input to receive data from the plurality of sensors and an output to send a signal to control the generator of the fluid-driven power generation unit, wherein the turbine control circuit is configured to determine at least one weather condition based on data from one or more of the plurality of sensors and to control the generator motoring the rotor of the generator to mitigate a potential impact of the determined at least one weather condition on the fluid-driven power generation unit;
   wherein the determined at least one weather condition comprises a winter precipitation event at the fluid-driven power generation unit and
   wherein controlling the generator comprises motoring the rotor of the generator to achieve at least minimum rotational speed to avoid precipitation building up in a fluid flow path of the fluid-driven power generation unit.

9. The turbine controller of claim 8, wherein the turbine control circuit is further configured to determine a current rotational velocity of the rotor of the generator and wherein motoring the generator to achieve at least minimum rotational velocity is performed only when the current rotational velocity of the rotor of the generator is below the minimum rotational velocity.

10. The turbine controller of claim 8, wherein the turbine control circuit further comprises a communication circuit to receive a weather-related data from an external source, wherein the turbine control circuit uses the received weather-related data to determine the at least one weather condition.

11. The turbine controller of claim 8, wherein the turbine control circuit is further configured to switch the generator to a power source to motoring the rotor of the generator, wherein the power source comprises at least one of a power grid to which the fluid-driven power generation unit is connected, and a battery.

12. The turbine controller of claim 8, wherein the turbine control circuit is further configured to activate an active heat source to further mitigate the potential impact of the determined at least one weather condition.

13. The turbine controller of claim 8, wherein motoring a rotor of the generator comprises causing the rotor to rotate at a fixed rotational speeds or a selected one of a set of fixed rotational speeds.

14. The turbine controller of claim 8, wherein motoring a rotor of the generator comprises causing the rotor to rotate at a temporally varying rotational speed.

15. The turbine controller of claim 8, wherein the turbine control circuit is further configured to determine a direction to rotate the rotor based on the weather condition.

16. A fluid-driven power generation unit comprising:
   a power generator comprising a rotor and a stator that converts wind power into electrical energy;
   an electrical circuit comprising a power input for connection to a power source and a power output to motor the rotor of the generator;
   a plurality of sensors; and
   a turbine control circuit comprising an input to receive data from the plurality of sensors and an output to send a signal to control the generator, wherein the turbine control circuit is configured to determine at least one weather condition based on data from one or more of the plurality of sensors and to control the generator to motor the rotor of the generator to mitigate a potential impact of the determined at least one weather condition on the fluid-driven power generation unit;
   wherein the determined at least one weather condition comprises a winter precipitation event at the fluid-driven power generation unit and
   wherein controlling the generator comprises motoring a rotor of the generator to achieve at least minimum rotational speed to avoid precipitation building up in a fluid flow path of the fluid-driven power generation unit.

17. The fluid-driven power generation unit of claim 16, wherein the turbine control circuit is further configured to determine a current rotational velocity of a rotor of the generator and wherein motoring the generator to achieve at least minimum rotational velocity is performed only when the current rotational velocity of the rotor of the generator is below the minimum rotational velocity.

18. The fluid-driven power generation unit of claim 16, wherein
   the turbine control circuit further comprises a communication circuit to receive weather-related data from an external source, wherein the turbine control circuit uses the received weather-related data to determine the at least one weather condition.

19. The fluid-driven power generation unit of claim 16, wherein the turbine control circuit is further configured to switch the generator to a power source to motor the rotor of the generator, wherein the power source comprises at least one of a power grid to which the fluid-driven power generation unit is connected, and a battery.

20. The fluid-driven power generation unit of claim 16, wherein motoring a rotor of the generator comprises causing the rotor to rotate at a fixed rotational speeds or a selected one of a set of fixed rotational speeds.

21. The fluid-driven power generation unit of claim 16, wherein motoring a rotor of the generator comprises causing the rotor to rotate at a temporally varying rotational.

\* \* \* \* \*